(12) United States Patent
Oliveira et al.

(10) Patent No.: US 12,311,887 B2
(45) Date of Patent: May 27, 2025

(54) CARGO MANAGEMENT SYSTEM

(71) Applicant: Ford Global Technologies, LLC, Dearborn, MI (US)

(72) Inventors: Fernando Ribeiro de Oliveira, Salvador (BR); Paulo Neto, Camacari (BR); Daniel Santos Ferreira, Pitangueiras (BR); Oscar Ikuno, Santa Cruz Cabralia (BR); Fabio Figueiredo, Lauro de Freitas (BR); Yuri Kaluf Alencar, Lauro de Freitas (BR); Rodrigo Rodrigues, Salvador (BR)

(73) Assignee: Ford Global Technologies, LLC, Dearborn, MI (US)

( * ) Notice: Subject to any disclaimer, the term of this patent is extended or adjusted under 35 U.S.C. 154(b) by 394 days.

(21) Appl. No.: 17/862,634

(22) Filed: Jul. 12, 2022

(65) Prior Publication Data

US 2024/0017675 A1   Jan. 18, 2024

(51) Int. Cl.
*B60R 7/08* (2006.01)
*B60R 7/02* (2006.01)

(52) U.S. Cl.
CPC . *B60R 7/08* (2013.01); *B60R 7/02* (2013.01)

(58) Field of Classification Search
CPC .................................. B60R 7/08; B60R 7/02
USPC .................. 224/608; 296/37.16, 37.1, 24.43
See application file for complete search history.

(56) References Cited

U.S. PATENT DOCUMENTS

| | | | | |
|---|---|---|---|---|
| 1,325,349 | A * | 12/1919 | Burgess | B65D 9/32 217/62 |
| 3,715,044 | A * | 2/1973 | Simons | B60P 3/38 224/328 |
| 4,540,213 | A | 9/1985 | Herlitz et al. | |
| 5,161,700 | A * | 11/1992 | Stannis | B60R 7/02 211/175 |
| 5,439,150 | A * | 8/1995 | Trahms | B60R 9/00 224/543 |
| 5,484,091 | A * | 1/1996 | Malinowski | B60R 7/02 224/42.33 |
| 5,715,978 | A * | 2/1998 | Ackeret | B60R 7/02 224/310 |
| 6,308,873 | B1 * | 10/2001 | Baldas | B60R 7/02 217/15 |

(Continued)

FOREIGN PATENT DOCUMENTS

KR   200363216 Y1   10/2004

*Primary Examiner* — Nathan J Newhouse
*Assistant Examiner* — Lester L Vanterpool
(74) *Attorney, Agent, or Firm* — Vichit Chea; Price Heneveld LLP

(57) ABSTRACT

A vehicle includes a first storage assembly configured to be disposed within a seating row. A first base is disposed on seatbacks and a sidewall is rotatably coupled to the first base. A divider is disposed over the first base and configured to slidably engage the sidewall to define first and second storage spaces. A second storage assembly is configured to be disposed in a cargo area. The second storage assembly includes a second base disposed on a floor in the cargo area. A first frame member is coupled to the second base and defines a first rail. A second frame member is coupled to the second base and has a second rail. A door is coupled to the first frame member and the second frame member and configured to translate along the first and second rails between an opened position and a closed position.

20 Claims, 16 Drawing Sheets

(56) References Cited

U.S. PATENT DOCUMENTS

| | | | |
|---|---|---|---|
| 6,609,744 B2 * | 8/2003 | Gehring | B60R 7/02 |
| | | | 220/531 |
| 6,623,059 B2 | 9/2003 | Gehring et al. | |
| 6,644,709 B2 * | 11/2003 | Inagaki | B60R 5/04 |
| | | | 296/37.16 |
| 6,874,667 B2 * | 4/2005 | Dykstra | B60R 5/04 |
| | | | 224/543 |
| 7,559,594 B2 * | 7/2009 | McMillen | B60N 2/832 |
| | | | 297/14 |
| 9,132,786 B2 | 9/2015 | Roach et al. | |
| 10,070,722 B2 | 9/2018 | Peregrina Loera et al. | |
| 10,137,839 B1 * | 11/2018 | Kelley, Jr. | B60R 7/02 |
| 10,336,275 B2 | 7/2019 | Sundararajan et al. | |
| 10,351,066 B2 | 7/2019 | Munro et al. | |
| 10,592,851 B1 | 3/2020 | Patel et al. | |
| 10,604,051 B2 * | 3/2020 | Valencia Flores | B60N 2/90 |
| 10,618,447 B2 | 4/2020 | Putcha et al. | |
| 10,773,632 B2 * | 9/2020 | Salter | B60P 3/00 |
| 10,988,084 B2 * | 4/2021 | Gerweck | B60R 5/045 |
| 11,279,300 B1 * | 3/2022 | Line | B60R 13/013 |
| 11,738,691 B2 * | 8/2023 | Westfall | B60R 7/043 |
| | | | 296/24.44 |
| 11,897,427 B2 * | 2/2024 | Rosas Vazquez | B60R 5/045 |
| 11,927,046 B2 * | 3/2024 | Zhu | B60R 7/02 |
| 2004/0134946 A1 * | 7/2004 | Gammon | B60R 7/02 |
| | | | 224/542 |
| 2018/0194293 A1 * | 7/2018 | Loew | B60R 7/02 |
| 2019/0202334 A1 * | 7/2019 | Bhirud | B60R 7/02 |
| 2020/0108777 A1 | 4/2020 | Mozurkewich et al. | |
| 2020/0307721 A1 | 10/2020 | Patel et al. | |
| 2021/0309132 A1 * | 10/2021 | Plank S | B60R 7/04 |
| 2022/0266756 A1 * | 8/2022 | Harmon | B60R 5/04 |
| 2023/0115047 A1 * | 4/2023 | Meador | B60R 5/003 |
| | | | 414/267 |

* cited by examiner

CARGO MANAGEMENT SYSTEM

FIELD OF THE DISCLOSURE

The present disclosure generally relates to a cargo management system. More specifically, the present disclosure relates to a cargo management system for a vehicle.

BACKGROUND OF THE DISCLOSURE

Many vehicles include an area for storing items. These areas may include trunk or cargo areas within the vehicle.

SUMMARY OF THE DISCLOSURE

According to at least one aspect of the present disclosure, a vehicle includes a first storage assembly configured to be disposed on seating assemblies within a seating row. A first base is disposed on seatbacks of the seating assemblies. At least one sidewall is rotatably coupled to the first base. A divider is disposed over the first base and configured to slidably engage the at least one sidewall to define a first storage space and a second storage space. A second storage assembly is configured to be disposed in a cargo area adjacent to the seating row. The second storage assembly includes a second base disposed on a floor in the cargo area. A first frame member is coupled to the second base and defines a first rail. A second frame member is coupled to the second base and defines a second rail. A cargo storage space is defined between the first frame member and the second frame member. A door is coupled to the first frame member and the second frame member and configured to translate along the first and second rails between an opened position and a closed position.

According to another aspect of the present disclosure, a cargo management system for a vehicle includes a first storage assembly configured to be disposed on a rear seating row and including a first base. First and second sidewalls are rotatably coupled to the first base. The first and second sidewalls each define a groove. A divider extends between the first and second sidewall. The divider has projections slidably received within the grooves. A second storage assembly is configured to be disposed in a cargo area. The second storage assembly includes a second base. First and second frame members are coupled to the second base, and each of the first and second frame members defines a rail. A first door is coupled to the first and second frame members and configured to translate along the rails between an opened position and a closed position.

According to another aspect of the present disclosure, a cargo management system for a vehicle includes a first storage assembly including a first base. First and second sidewalls are rotatably coupled to the first base, and each of the first and second sidewalls defines a groove. A divider extends between the first and second sidewalls. The divider includes projections configured to translate along the grooves. A second storage assembly is coupled to the first storage assembly. The second storage assembly includes a second base. A first side frame member is coupled to a first side of the second base and defines a first side rail. A second side frame member is coupled to a second side of the second base and defines a second side rail. A central frame member is coupled to the second base between the first and second side frame members. The central frame member defines a first central rail and a second central rail. A first door is coupled to the first side frame member and the central frame member. A second door is coupled to the second side frame member and the central frame member.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
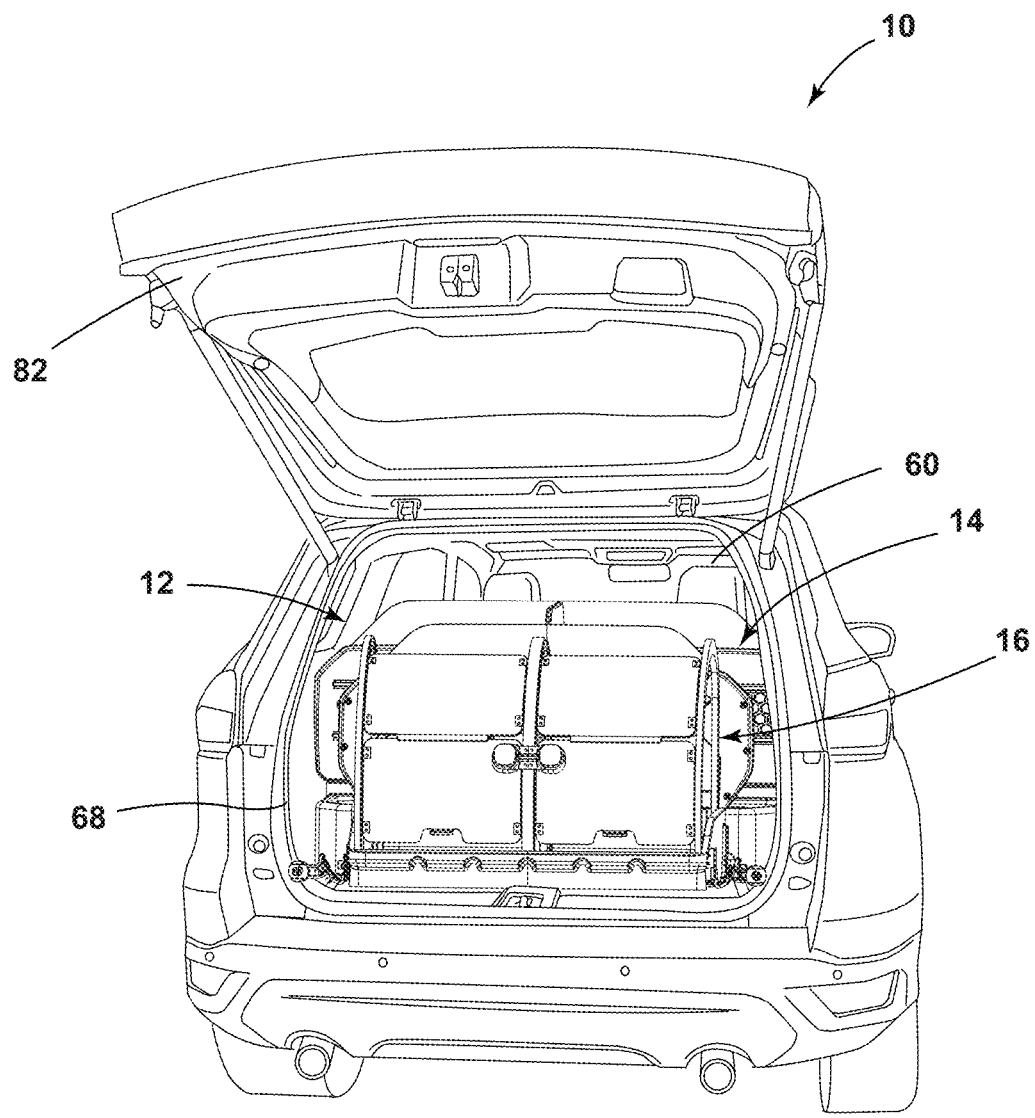
FIG. 1 is a rear perspective view of a vehicle with a cargo management system, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring to FIGS. 1-19, reference numeral 10 generally designates a vehicle 10 that includes a cargo management system 12 having a first storage assembly 14 and a second storage assembly 16. The first storage assembly 14 is configured to be disposed on seating assemblies 18. The first storage assembly 14 includes a first base 20 disposed on seatbacks 22 of the seating assemblies 18. At least one sidewall 24 is rotatably coupled to the first base 20. A divider 26 is disposed over the first base 20 and configured to slidably engaged the sidewall 24 to define a first storage space 28 and a second storage space 30. The second storage assembly 16 is configured to be disposed in a cargo area 32 adjacent to the seating assemblies 18. The second storage assembly 16 includes a second base 34 disposed on a floor 36 in the cargo area 32. A first frame member 38 is coupled to the second base 34 and defines a first rail 40. A second frame member 42 is coupled to the second base 34 and defines a second rail 44. A cargo storage space 46 is defined between the first frame member 38 and the second frame member 42. A first inner door 48 is coupled to at least one of the first and second frame members 38, 42 and configured to translate along the first and second rails 40, 44 between an opened position and a closed position.

Figure 2:
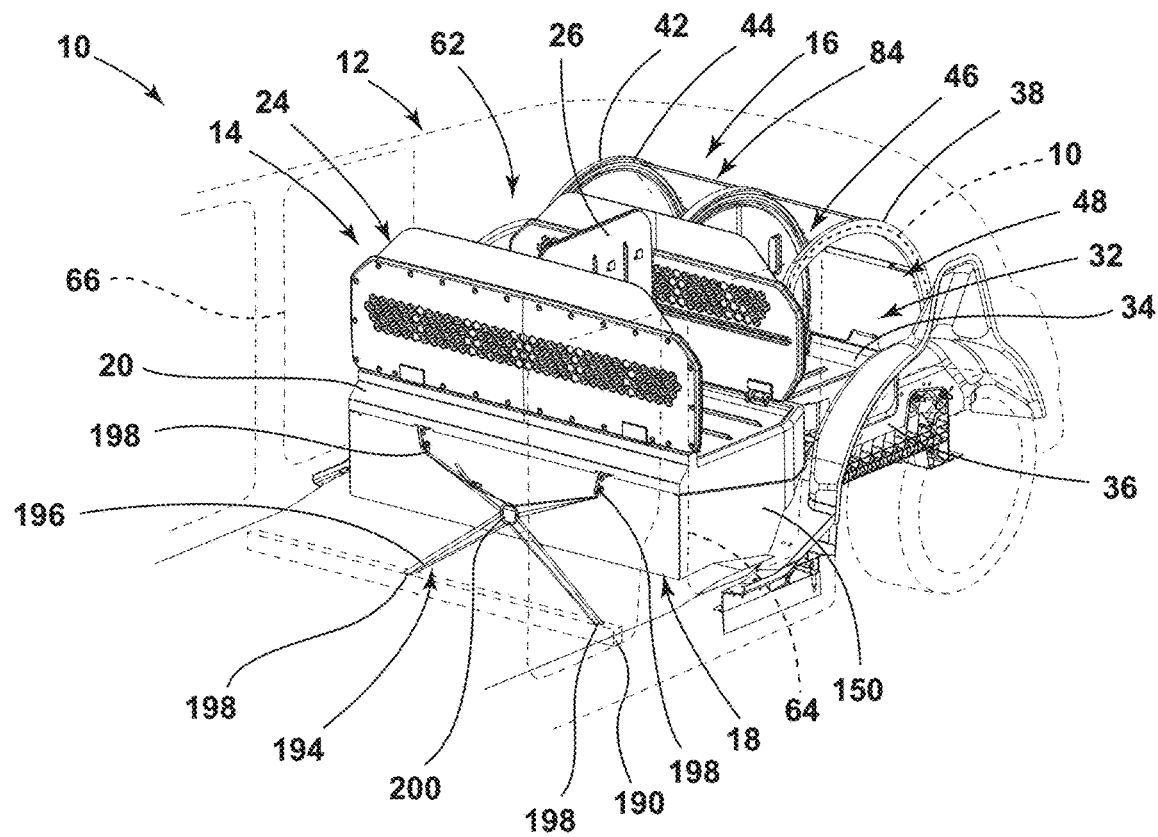
FIG. 2 is a side perspective view of a cargo management system for a vehicle, according to the present disclosure.
Figure 3:
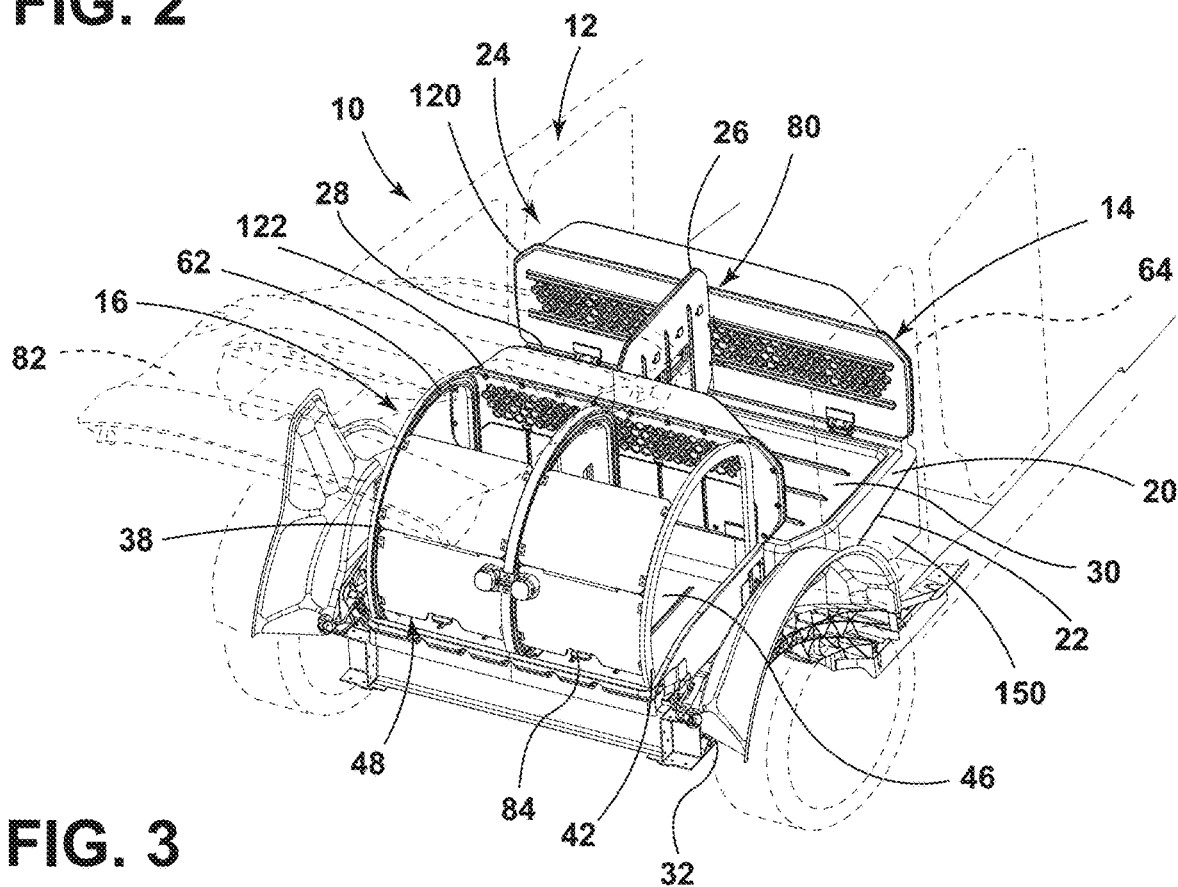
FIG. 3 is a side perspective view of a cargo management system for a vehicle, according to the present disclosure.

Referring to FIGS. 1-3, the vehicle 10 includes an interior compartment 60 with multiple seating assemblies 18 for supporting passengers thereon. The seating assemblies 18 are generally arranged in multiple seating rows. The interior compartment 60 also includes the cargo area 32 disposed behind a rear seating space or row (e.g., in a vehicle-rearward direction). Any practicable number of seating assemblies 18 and seating rows may be disposed within the interior compartment 60 without departing from the teachings herein.

In the illustrated configuration, the vehicle 10 which includes the cargo management system 12 is a sport utility vehicle. The vehicle 10 may be a sport utility vehicle, a sedan, a van, a truck, a crossover, other wheel motor vehicles 10, or other styles of vehicles 10. Moreover, the cargo management system 12 may be utilized for personal and/or commercial purposes, such as, for ride-providing services (e.g., chauffeuring), transporting, deliveries, ridesharing services, etc.

In certain aspects, the vehicle 10 may be used for transporting both people and goods. The cargo management system 12 can be installed within the vehicle 10 for transporting goods and removed, or partially removed, from the vehicle 10 to provide seating spaces for passengers. The configuration of the interior compartment 60 and the cargo management system 12 allows for quick and convenient installation and removal of the cargo management system 12 to transition between carrying people and goods. Additionally, various adjustable components of the cargo management system 12 may be moved to provide flexibility in defining the different storage compartments 62 based on the goods disposed therein.

Referring still to FIGS. 1-3, in the illustrated example, the vehicle 10 is an autonomous vehicle 10 that can be used for transporting goods and providing ridesharing or ride-providing services to people. It is contemplated that the vehicle 10 may be a fully autonomous vehicle 10 (e.g., operated without the human operator), a partially autonomous vehicle 10 (e.g., operated with or without the human operator), a non-autonomous vehicle 10 (e.g., operated with the human operator), or combinations thereof without departing from the teachings herein.

Referring still to FIGS. 2 and 3, the cargo management system 12 includes the first storage assembly 14 disposed on the seating assemblies 18 in the rear seating row. The first storage assembly 14 extends in a cross-car direction from a first rear side door 64 (e.g., left side rear door) to a second rear side door 66 (e.g., right side rear door) within the rear seating space. In the fore-aft direction, the first storage assembly 14 extends from an adjacent seating row (e.g., a front seating row) to the cargo area 32. Additionally or alternatively, the first storage assembly 14 extends vertically from the seating assemblies 18 to a headliner of the vehicle 10. In this way, the first storage assembly 14 substantially fills the rear seating space when installed in the vehicle 10.

The second storage assembly 16 is disposed adjacent to the first storage assembly 14 on the floor 36 within the cargo area 32. In the cross-car direction, the second cargo assembly generally extends between opposing sides of a vehicle body that defines the cargo area 32. In the fore-aft direction, the second storage assembly 16 extends from the first storage assembly 14 and is proximate to the rear seating row to a trunk or liftgate opening 68. In this way, the second storage assembly 16 substantially fills the cargo area 32 when installed in the vehicle 10.

The first storage assembly 14 and the second storage assembly 16 may be utilized together or may be utilized separately. For example, the first storage assembly 14 may be utilized to store goods in the rear seating space, while the cargo area 32 is without the second storage assembly 16 to be available for larger or bulkier items. In another non-limiting example, the second storage assembly 16 may be utilized within the cargo area 32 to provide storage for goods and items, while the rear seating space is utilized for supporting passengers. In an additional non-limiting example, the first and second storage assemblies 14, 16 may be utilized together for providing multiple separate compartments 62 for storing and transporting various goods and items.

The first storage assembly 14 is disposed on the seating assemblies 18 adjacent to the first and second side doors 64, 66. A storage space 80 defined by the first storage assembly 14 may be accessed via one or both of the side doors 64, 66. The second storage assembly 16 is accessible via the liftgate opening 68 when a trunk or liftgate 82 of the vehicle 10 is opened. In certain aspects, the second storage assembly 16 includes additional inner doors 48, 84 for preventing and allowing access to the cargo space 46 defined by the second storage assembly 16. In this way, even when the liftgate 82 is open, if the additional inner doors 48, 84 are closed, the cargo space 46 may not be accessed.

Referring to FIGS. 4-7, the seating assemblies 18 in the rear seating row are illustrated in a folded or stowed position. In the stowed position, a rear surface 86 of the seatbacks 22 of the seating assemblies 18 are used to support the first storage assembly 14. The first base 20 of the first storage assembly 14 is disposed on and coupled to the rear surfaces 86 of the seatbacks 22. The first base 20 has a first edge 88, which is generally a vehicle-forward edge, and a second edge 90, which is generally a vehicle-rearward edge. The first base 20 has a first height at the first edge 88 and a second height at the second edge 90. Generally, the first height is less than such that the first base 20 increases in height in a front-to-rear direction when installed in the vehicle 10. When the seatbacks 22 are in the folded position, the seatbacks 22 are disposed at an angle with a forward portion at a higher position than a rear portion. The first base 20 with the increasing height from the first edge 88 to the second edge 90 mates with the angled seatbacks 22 and provides a substantially level support surface 104 for the first base 20.

The first base 20 includes an outer rim 100 that extends about a recessed region 102 having the support surface 104. The outer rim 100 assists in retaining goods on the support surface 104 within the recessed region 102. Additionally, the support surface 104 includes slide stops 106. The slide stops 106 are generally elongated ribs arranged in a parallel configuration in the cross-car direction. The slide stops 106 may assist in retaining items in the selected position and prevent sliding of the items on the support surface 104 of the first base 20. It is contemplated that the slide stops 106 may be selectively added or removed from the first base 20.

The first base 20 is coupled to a first support frame 108, which is generally a metal frame that extends in a U-shape adjacent to a bottom surface 110 of the first base 20. The first support frame 108 extends along a portion of the perimeter of the first base 20, extending along the vehicle-forward and vehicle-side edges. The first support frame 108 is configured to provide support for the first storage assembly 14, as well as provide attachment locations to other components of the cargo management system 12. The first base 20 includes hook features 112 configured to couple the first base 20 with the first support frame 108. The hook features 112 may form an interference fit or snap engage with the first support frame 108. Additionally, ends of the first support frame 108 generally extend beyond the first base 20 in a vehicle-rearward direction when the first storage assembly 14 is installed in the vehicle 10.

The first storage assembly 14 includes first and second sidewalls 120, 122 (e.g., the at least one sidewall 24). The first and second sidewalls 120, 122 are coupled to the first edge 88 and the second edge 90 of the first base 20, respectively. Accordingly, the first and second sidewalls 120, 122 provide partitions between the storage space 80 of the first storage assembly 14, an adjacent seating row, and the cargo area 32.

The first and second sidewalls 120, 122 are rotatably coupled to the first base 20, generally via hinge assemblies 124. In this way, the first and second sidewalls 120, 122 can be lowered to a folded configuration over the first base 20 to provide more convenient installation and removal of the first storage assembly 14 within the vehicle 10. The first and second sidewalls 120, 122 can then be rotated to upright positions, extending vertically from the first base 20 to define the storage space 80. The first and second sidewalls 120, 122 are configured to be locked, latched, or otherwise retained in the upright position. The first and second sidewalls 120, 122 include transparent upper portions 126 that abut the headliner of the vehicle 10. The transparent upper portion 126 provides increased visibility through the interior compartment 60 in the fore-aft direction while providing the partitions between the adjacent seating row and the cargo area 32.

Each of the first and second sidewalls 120, 122 defines a plurality of apertures 128, which may lessen the weight of the first storage assembly 14 and provide visibility into the storage space 80 and/or through the first storage assembly 14. Further, each of the first and second sidewalls 120, 122 includes grooves 130 extending parallel to one another in the cross-car direction. The grooves 130 on each of the first and second sidewalls 120, 122 are generally arranged on opposing sides (i.e., above and below) of the respective plurality of apertures 128. The grooves 130 on the first sidewall 120 are generally horizontally aligned with the grooves 130 on the second sidewall 122.

Figure 4:
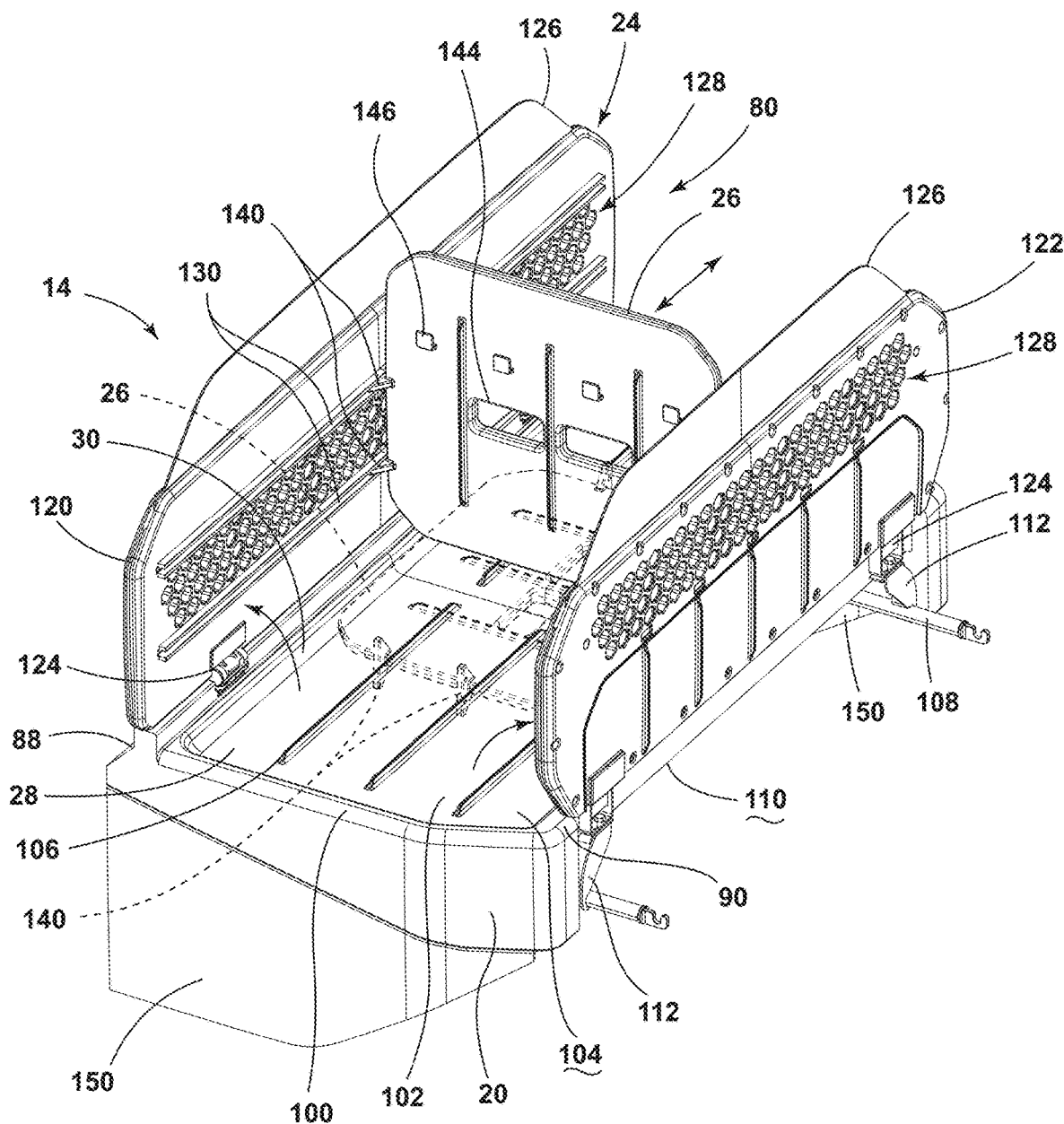
FIG. 4 is a side perspective view of a first storage assembly for a rear seating space of a vehicle, according to the present disclosure.
Figure 5:
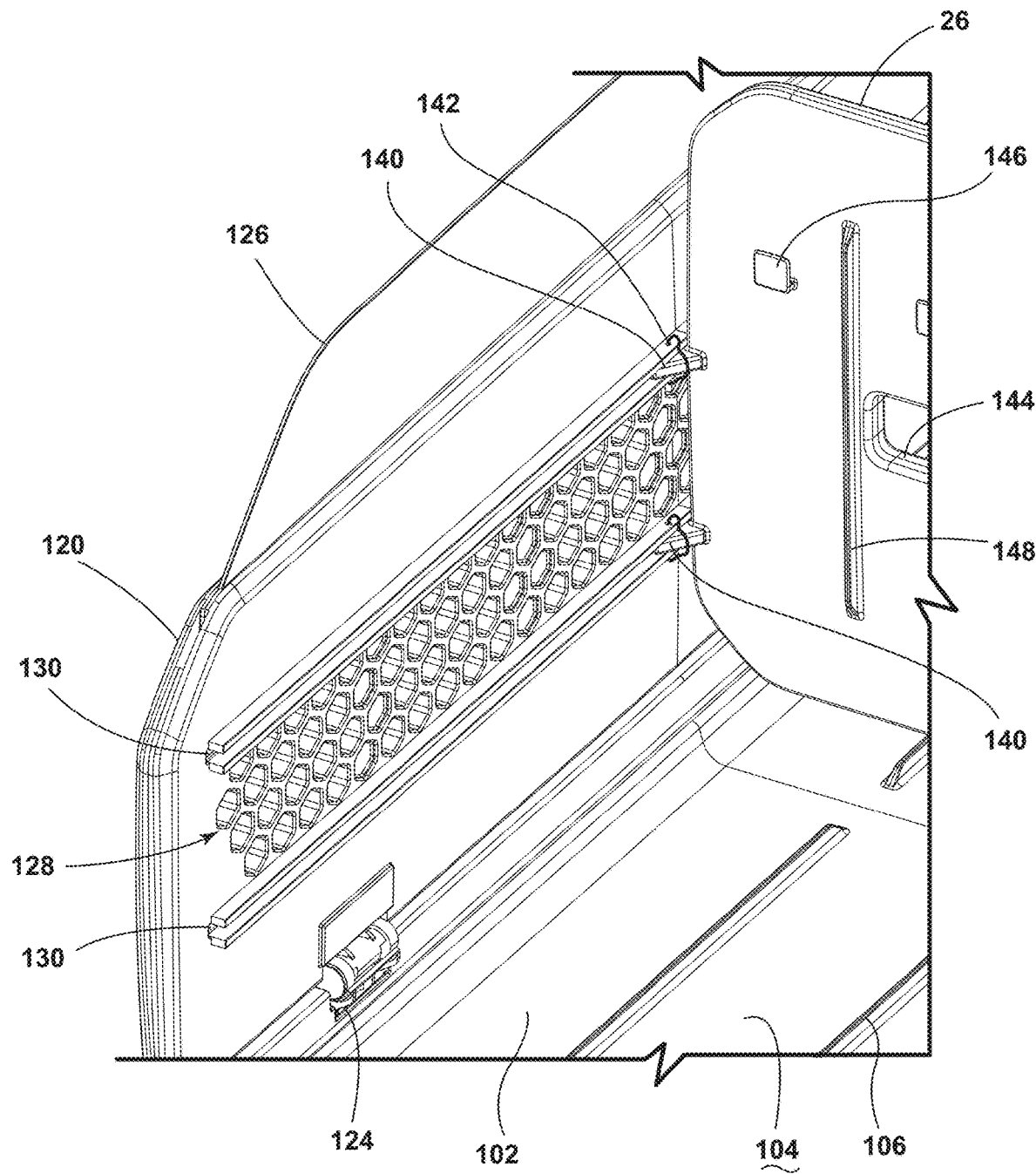
FIG. 5 is a partial side perspective view of an engagement between a sidewall and a divider for a first storage assembly of a cargo management system, according to the present disclosure.

Referring still to FIGS. 4 and 5, the first storage assembly 14 includes the divider 26, which selectively partitions or divides the storage space 80 into the first storage space 28 and the second storage space 30. The first storage assembly 14 may be utilized with or without the divider 26 depending on the size of the space utilized for the goods being transported. The divider 26 extends between and engages the first and second sidewalls 120, 122. The divider 26 may provide additional support for the first and second sidewalls 120, 122 and may assist in retaining the first and second sidewalls 120, 122 in the upright positions.

Generally, the divider 26 extends over the first base 20 and may abut the support surface 104 or the slide stops 106 of the first base 20. The divider 26 includes slide projections 140 extending from opposing edges thereof, which are configured to be slidably received within the grooves 130 of the first and second sidewalls 120, 122, respectively. The first and second sidewalls 120, 122 may define receiving apertures proximate to the grooves 130, and the slide projections 140 may define receiving holes that align with the receiving apertures of the first and second sidewalls 120, 122. Pins 142 may be inserted through the receiving apertures and the receiving holes to secure the divider 26 in the selected position.

The divider 26 is configured to translate in the cross-car direction to adjust the size of the first and second storage spaces 28, 30. The engagement between the slide projections 140 and the grooves 130 may provide sufficient engagement to retain the divider 26 in the selected position. Additionally or alternatively, multiple apertures may be defined along the grooves 130 on the first and second sidewalls 120, 122 for securing the divider 26 in different positions with the pins 142 based on the select configuration of the first and second storage spaces 28, 30.

The divider 26 includes window openings 144 for viewing the other side of the first storage assembly 14. Additionally, the divider 26 includes hooks 146 for hanging bags and other goods or items on the divider 26. The divider 26 also includes slide stops 148, which extend vertically and which may assist in retaining the hanging items in a select position. The slide stops 148 on the divider 26 may also minimize the swinging of the hanging items.

Referring again to FIGS. 4, 6, and 7, the first storage assembly 14 is generally installed into the vehicle 10 through the liftgate opening 68. The first storage assembly 14 is inserted so the longitudinal extent extends in the fore-aft direction. During installation, the first and second sidewalls 120, 122 are rotated to the folded state adjacent to the first base 20. Once inserted into the internal compartment, the first storage assembly 14 is then rotated and/or slid to position the first base 20 on the seatbacks 22 of the seating assemblies 18 with the longitudinal extent extending in the cross-car direction.

Once positioned on the seating assemblies 18, side guards 150 may be coupled to the first base 20. The first base 20 includes coupling protrusions 152 extending downward from the bottom surface 110 along side edges from the first base 20. The side guards 150 extend past the seatbacks 22 and seat bases of the seating assemblies 18 to prevent access to the rear seating space outside of the first storage assembly 14.

Figure 6:
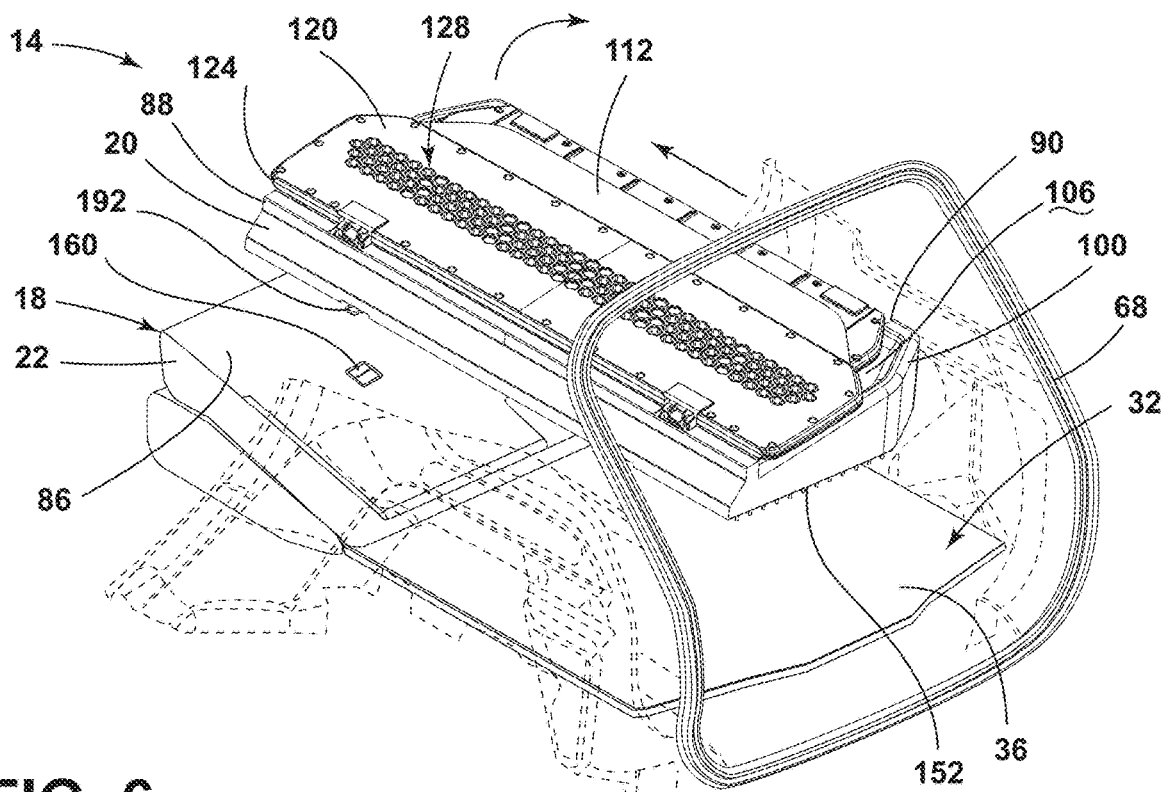
FIG. 6 is a partial side perspective view of a first storage assembly being installed within an interior compartment of a vehicle, according to the present disclosure.
Figure 7:
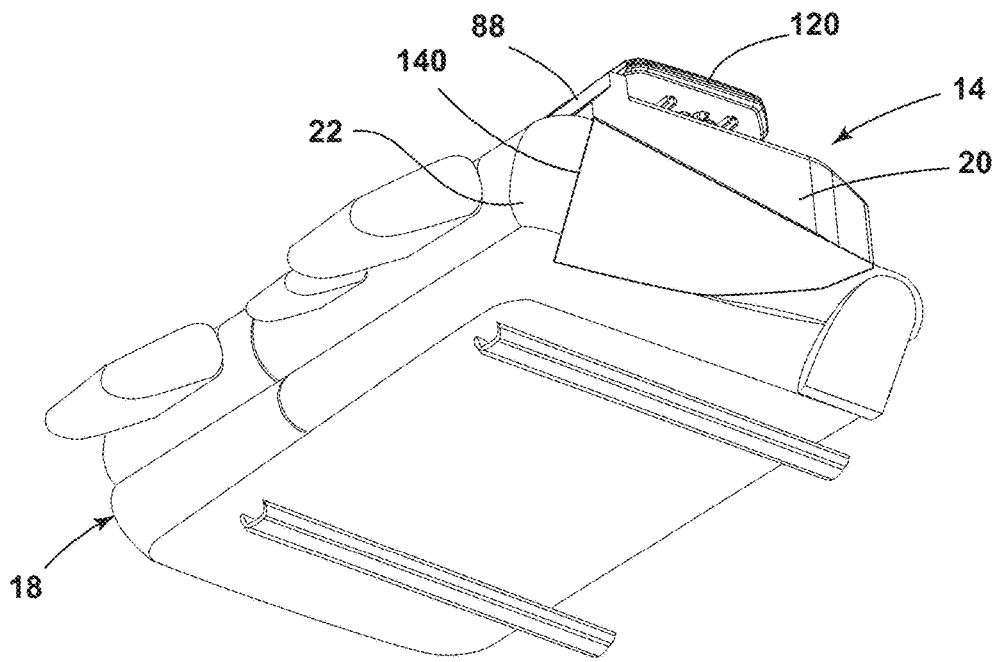
FIG. 7 is a side perspective view of seating assemblies in a seating row with a first storage assembly disposed on the seating assemblies, according to the present disclosure.
Figure 8:
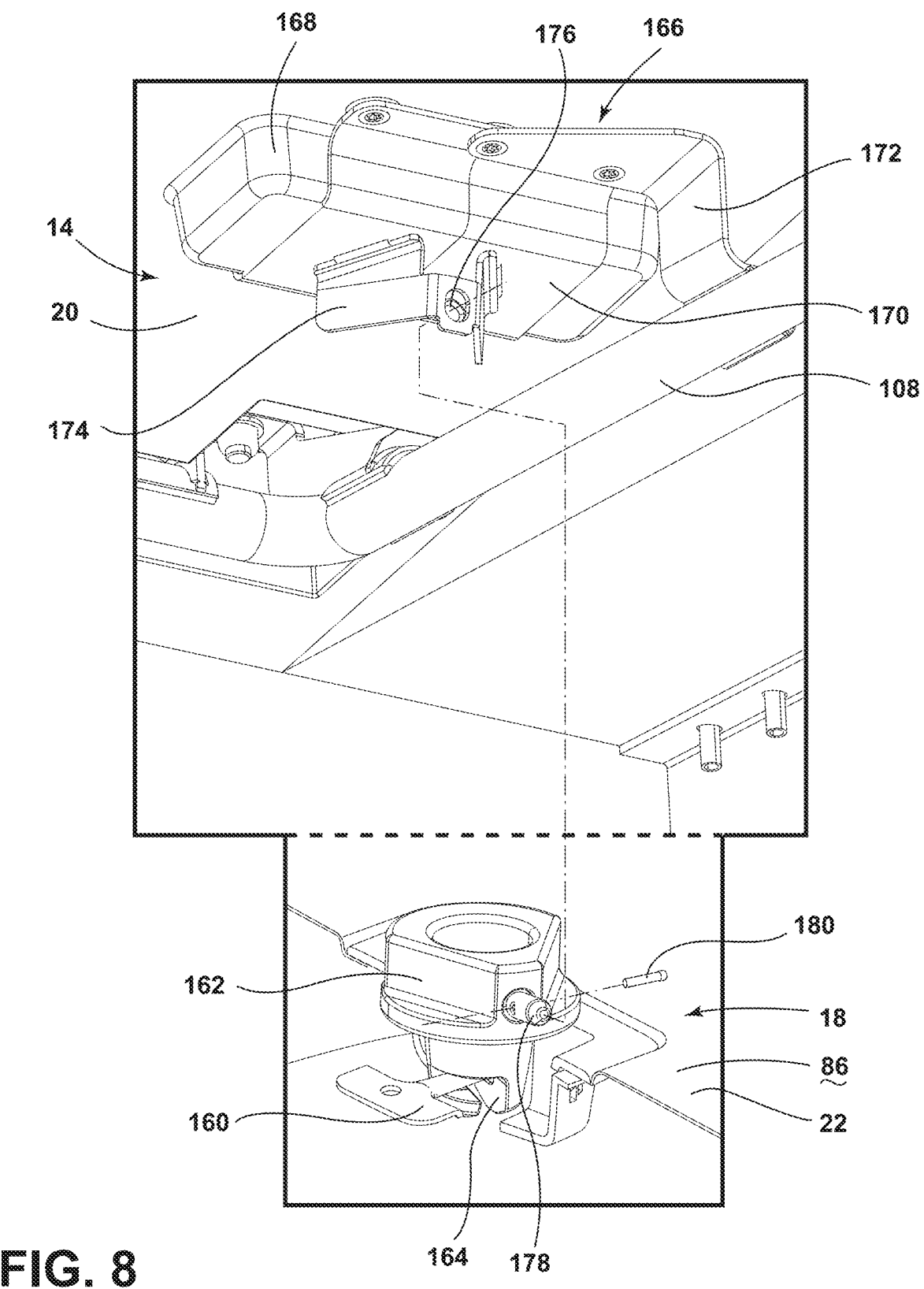
FIG. 8 is a partial side perspective exploded view of an engagement between a connector on a seatback and a first storage assembly of a cargo management system, according to the present disclosure.
Figure 9:
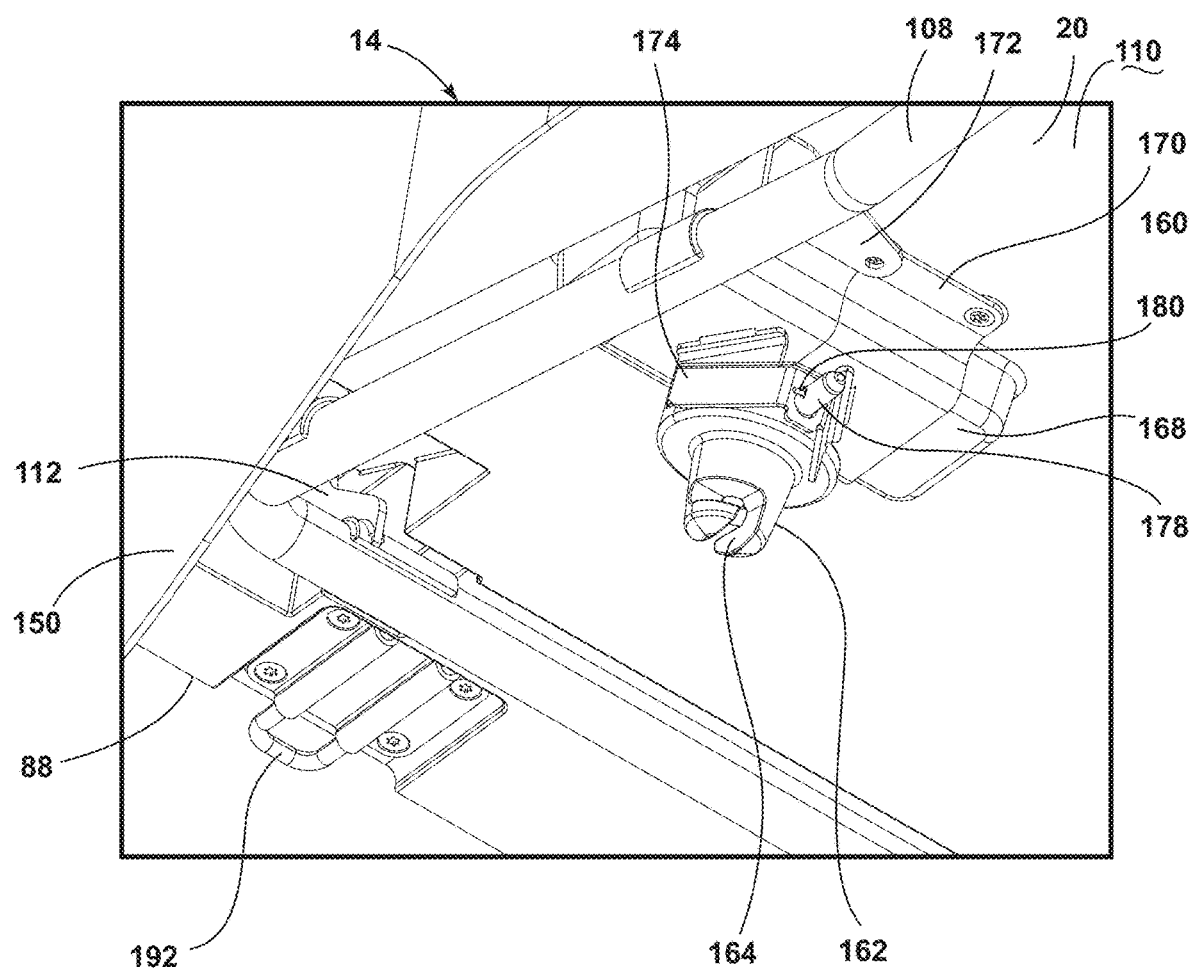
FIG. 9 is a partial side perspective view of the engagement between the connector and the first storage assembly of FIG. 8, according to the present disclosure.

Referring still to FIGS. 6 and 7, as well as FIGS. 8 and 9, the seatbacks 22 define recesses with support bars 160 extending across the respective recess. The support bars 160 provide attachment locations for the first storage assembly 14 to the seating assemblies 18. As illustrated in FIG. 8, a connector 162 is coupled to each support bar 160. The connector 162 defines a slot 164. The connector 162 is positioned for the support bar 160 to be moved into the slot 164, and then the connector 162 is rotated to move the support bar 160 further into the slot 164, locking the connector 162 onto the seating assembly 18.

The first base 20 includes a bracket assembly 166 coupled to a protruding portion 168 on the bottom surface 110 of the first base 20. The bracket assembly 166 includes a support bracket 170 coupled to the bottom surface 110 and a frame bracket 172 coupled to the support bracket 170. The frame bracket 172 couples the first base 20 to the first support frame 108. A receiving bracket 174 is also coupled to the support bracket 170. The receiving bracket 174 is V-shaped and extends vertically downward from the protruding portion 168 of the first base 20. The receiving bracket 174 defines an aperture 176 between the two angled sides.

The connector 162 includes angled surfaces on opposing sides of a locating projection 178. The first base 20 is configured to be positioned, such that the V-shaped receiving bracket 174 abuts the angled surfaces of the connector 162 with the locating projection 178 extending through the aperture 176. Once the locating projection 178 extends through the aperture 176, a pin 180 is positioned through a receiving hole in the locating projection 178 to secure the engagement between the first storage assembly 14 and the connector 162. Though only one connector 162 is illustrated engaging the bracket assembly 166, there are generally two connectors 162 that engage two bracket assemblies 166, respectively, on the first base 20. In this way, each side of the first base 20 is coupled to the seating assemblies 18.

Referring again to FIGS. 2 and 6, in certain aspects, the first storage assembly 14 may also be coupled to an internal support 190 of the vehicle 10 proximate to the first edge 88. The first base 20 includes coupling supports 192, which extend in the vehicle forward direction from the bottom surface 110. The coupling supports 192 provide locations for a strap assembly 194 to engage the first base 20. The strap assembly 194 includes one or more straps 196 and clips or hooks 198. The straps 196 form an "X" configuration about a central ring 200. Two hooks 198 coupled to the straps 196 engage the two coupling supports 192, respectively, at upper attachment locations, and two hooks 198 coupled to the straps 196 engage the internal support 190 at lower attachment locations.

Figure 10:
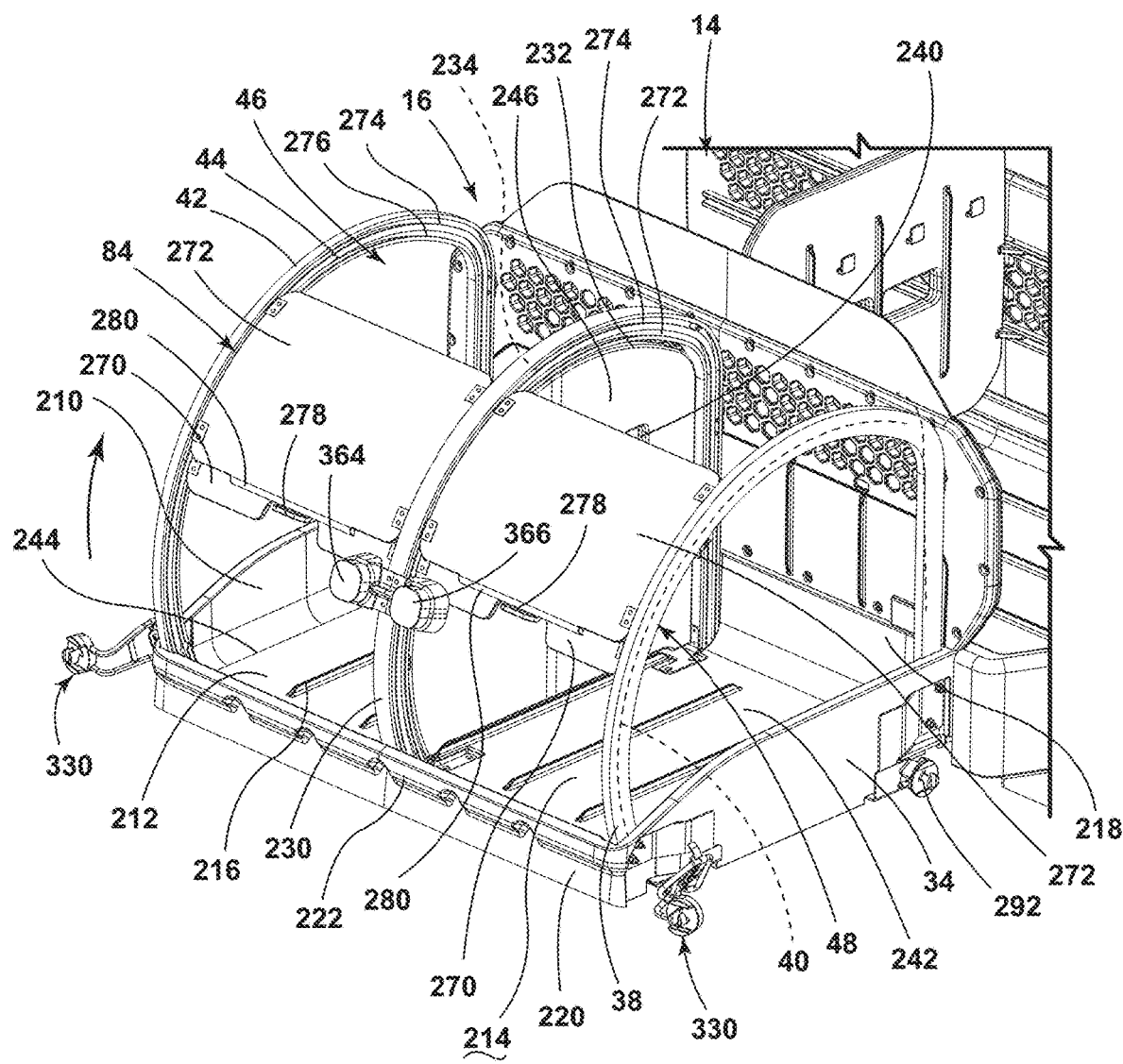
FIG. 10 is a side perspective view of a second storage assembly for a cargo area of a vehicle, according to the present disclosure.

Referring to FIG. 10, the second storage assembly 16 is disposed on the floor 36 in the cargo area 32. The second base 34 extends from the first base 20 to the liftgate opening 68 (FIG. 1). The second base 34 includes an outer rim 210 that extends about a recessed region 212 having a support surface 214. The outer rim 210 assists in retaining goods on the support surface 214. Similar to the first base 20 (FIG. 4), the second base 34 includes slide stops 216. The slide stops 216 of the second base 34 generally extend in the fore-aft direction and are arranged in a parallel configuration. The slide stops 216 operate to retain the items on the second base 34 in the selected position.

The outer rim 210 at a first edge 218 of the second base 34, which is generally a vehicle-forward edge, generally aligns with the outer rim 100 of the second edge 90 of the first base 20 (FIG. 4). The outer rim 210 at a second edge 220 of the second base 34 proximate the liftgate opening 68 (FIG. 1) is generally lowered or has a lesser height relative to the outer rim 210 at the first edge 218 to provide more convenient access to the cargo space 46. The configuration of the outer rim 210 may also provide more convenient addition and removal of the items within the cargo space 46. Additionally, the outer rim 210 may include an engagement portion 222 extending along the second edge 220. The engagement portion 222 may have an increased thickness and may provide a sloped surface to provide additional support for a load applied to the second edge 220 as users add and remove items into the second storage assembly 16.

The second storage assembly 16 includes three frame members 38, 42, 230, including two side frame members 38, 42 and a central frame member 230 disposed therebetween. The frame members 38, 42, 230 extend vertically from the first edge 218 of the second base 34 and curve to the second edge 220 of the second base 34. Each of the side frame members 38, 42 defines a side rail 40, 44, respectively, which is oriented toward the cargo space 46 of the second storage assembly 16. The central frame member 230 defined two central rails 232, 234 with the first central rail 232 oriented toward the first side frame member 38 and the second central rail 234 oriented toward the second side frame member 42. Each of the rails 40, 44, 232, 234 extends along the frame members 38, 42, 230, respectively, from proximate the second edge 220 to at least a location where the frame members 38, 42, 230 define a corner to extend to the first edge 218. The rails 40, 44, 232, 234 may extend along the entirety of the frame members 38, 42, 230.

Referring still to FIG. 10, the second storage assembly 16 may define the single cargo space 46 extending across the entire support surface 214. This configuration may be advantageous for larger items that take up more space or orders that include more items and utilize more space. Additionally or alternatively, the second storage assembly 16 may include a dividing wall 240 coupled to the central frame member, which divides the cargo space 46 into a first cargo space 242 and a second cargo space 244. Generally, the dividing wall 240 fills a space defined by the central frame member 230. In this way, the central frame member 230 extends along a substantial portion of a perimeter of the dividing wall 240, with the remaining portion of the perimeter being disposed adjacent to the support surface 214 of the second base 34. The dividing wall 240 may have windows 246 for viewing the adjacent cargo space 242, 244, and may also include hooks for hanging items.

Figure 11:
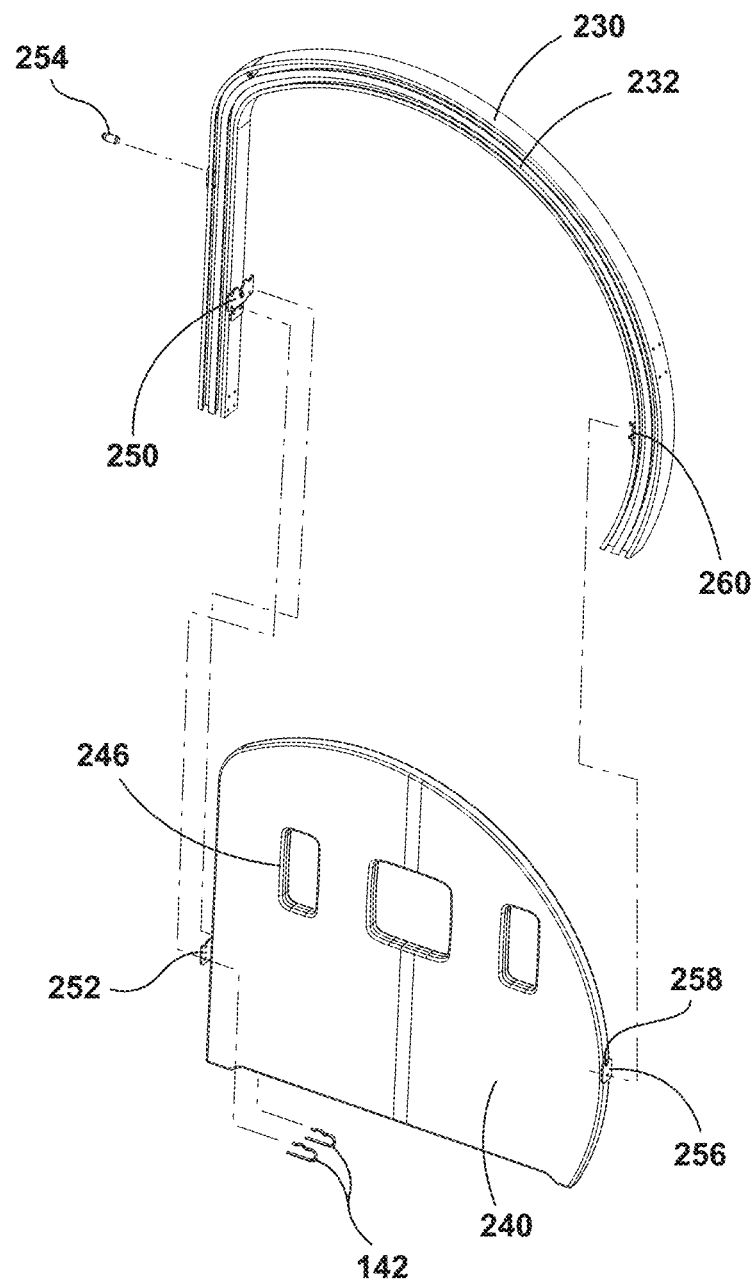
FIG. 11 is a side perspective exploded view of a frame member and a dividing wall for a second storage assembly, according to the present disclosure.

Referring still to FIG. 10, as well as FIG. 11, the dividing wall 240 may be selectively added to and removed from the second storage assembly 16 based on the goods being transported. On a vehicle-forward side, the central frame member 230 includes a first coupling bracket 250 that is configured to align with and abut a second coupling bracket 252 on the dividing wall 240. The first and second coupling brackets 250, 252 each have a width greater than the central frame member 230 and the dividing wall 240. The coupling brackets 250, 252 each define a receiving hole, which align with one another to receive a pin 254, securing the dividing wall 240 to the central frame member 230 at the vehicle-forward side.

On a vehicle-rearward side, the central frame member 230 includes a locating bracket 256 defining a groove 258. The divider 26 includes a coupling projection 260 configured to fit into the groove 258. The coupling projection 260 has a wider end cap, such that when the coupling projection 260 is positioned in the groove 258, the dividing wall 240 may be moved vertically and not in the fore-aft direction. The coupling brackets 250, 252, the locating bracket 256, and the coupling projection 260 retain the dividing wall 240 in the select position to divide the cargo space 46.

When the dividing wall 240 is included, the two separate cargo spaces 242, 244 may be selectively and independently accessed by the user. The second storage assembly 16 is accessible via the liftgate 82 as well as one or both of the additional inner doors 48, 84. The configuration of the inner doors 48, 84 provides flexibility in storing items in separate compartments 62 (e.g., the first and second cargo spaces 242, 244), while controlling access to each of the cargo spaces 242, 244 individually.

The inner doors 48, 84 extend between adjacent frame members 38, 42, 230. The first inner door 48 is coupled to the first side frame member 38 and the central frame member 230, and the second inner door 84 is coupled to the central frame member 230 and the second side frame member 42. In the illustrated configuration, each of the inner doors 48, 84 include two door panels 270, 272, which may move relative to one another and along the respective rails 40, 44, 232, 234 between opened and closed positions for selectively allowing and preventing access to the respective cargo space 242, 244. In various aspects, at least one of the door panels 270, 272 may be transparent, allowing the user to view the cargo space 46 within the second storage assembly 16 while the respective inner door 48, 84 is closed. The inner doors 48, 84 may be single panels without departing from the teachings herein.

Figure 12:
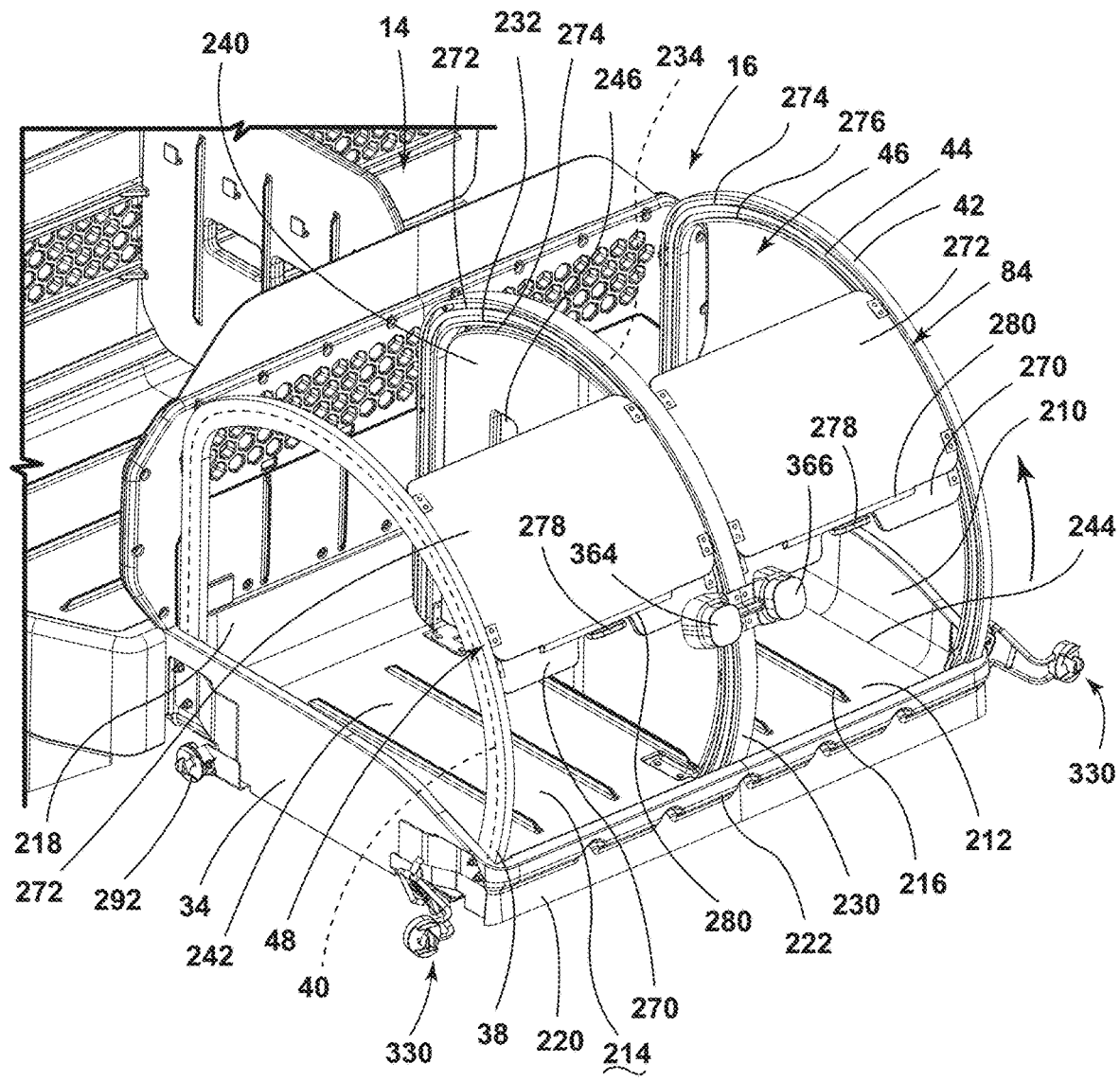
FIG. 12 is a partial side perspective view of a cargo management system for a vehicle with inner doors of a second storage assembly in a partially opened position, according to the present disclosure.
Figure 13:
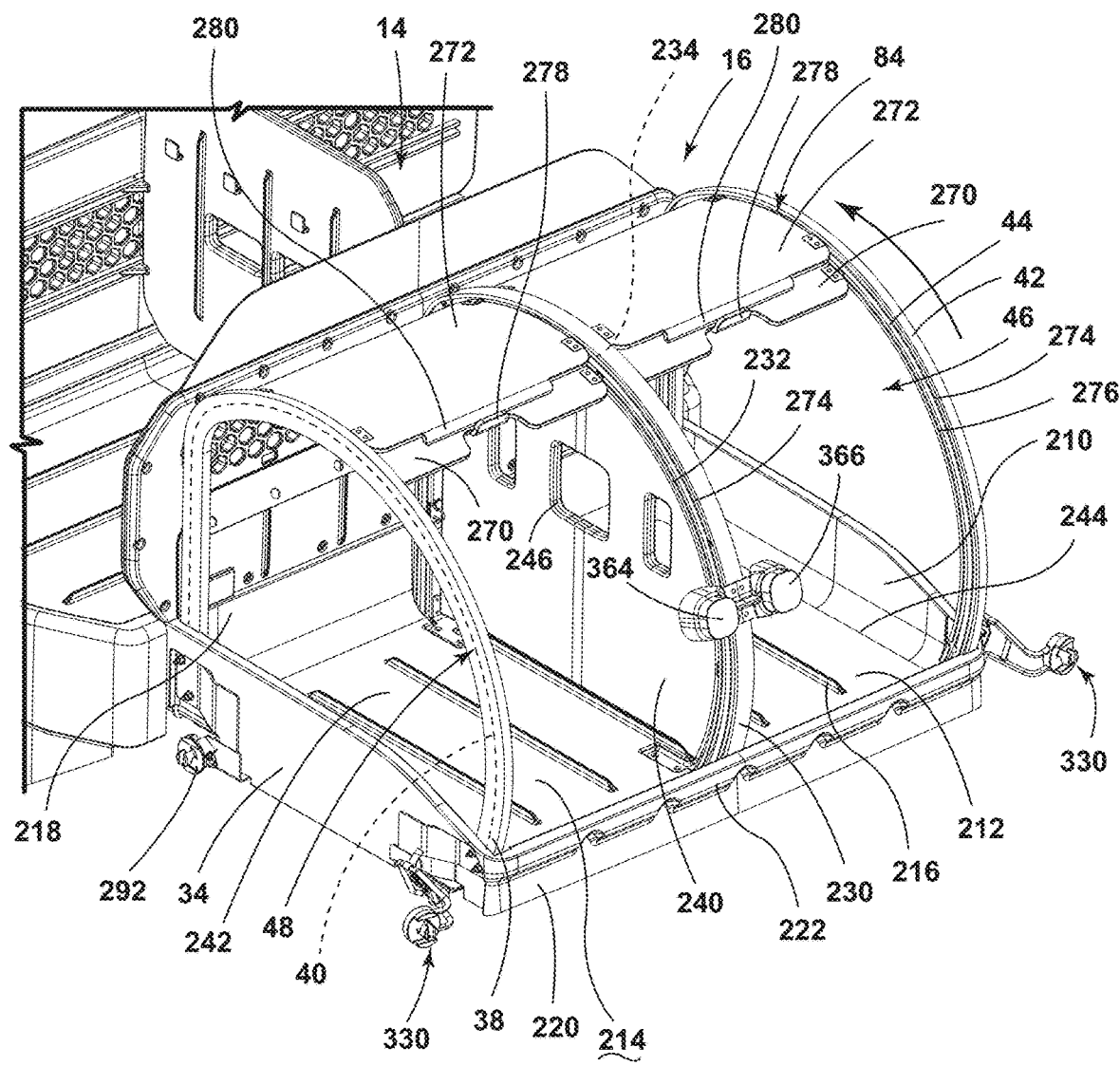
FIG. 13 is a partial side perspective view of a cargo management system for a vehicle with inner doors of a second storage assembly in an opened position, according to the present disclosure.
Figure 14:
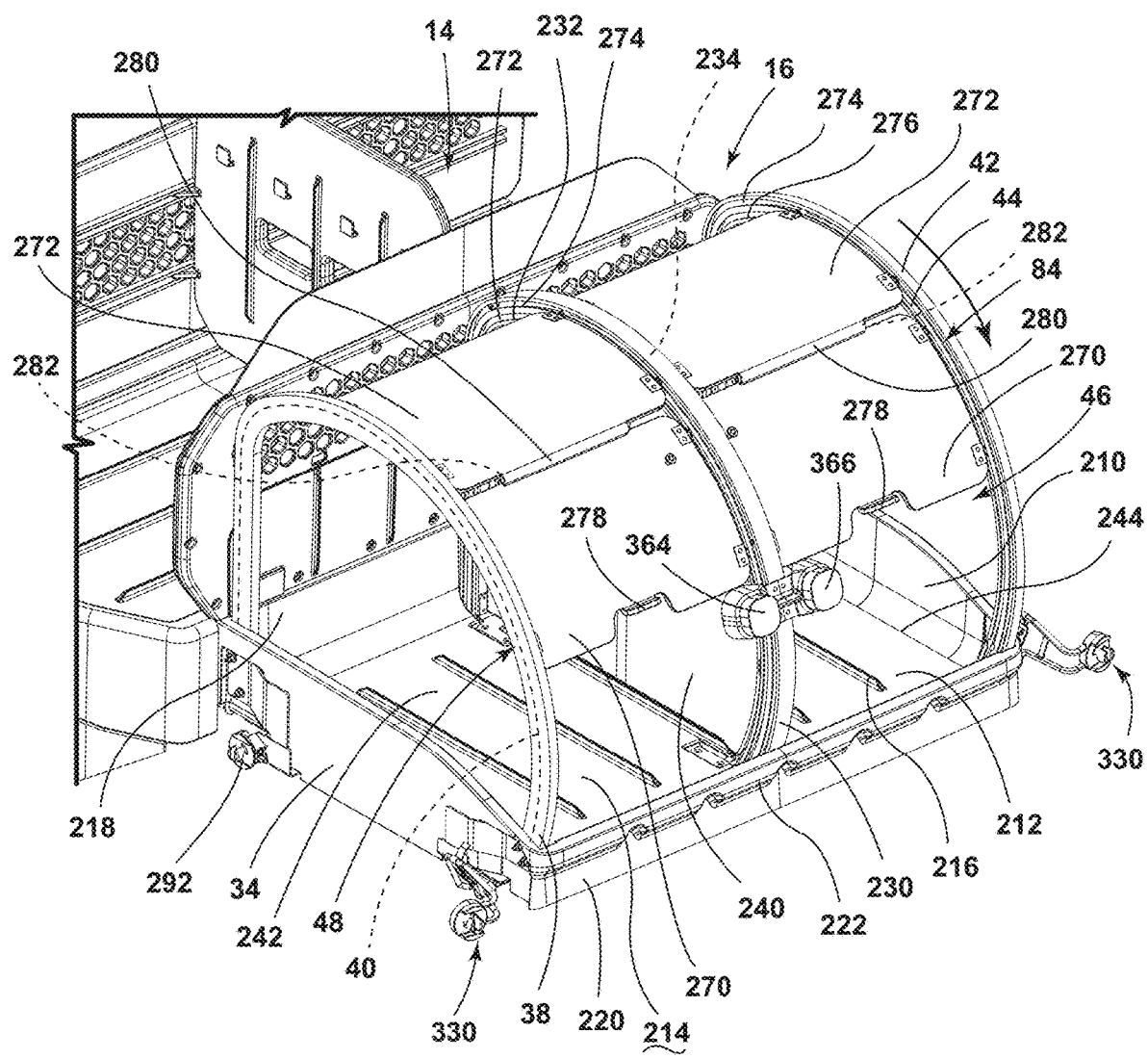
FIG. 14 is a partial side perspective view of a cargo management system for a vehicle with inner doors of a second storage assembly in a partially closed position, according to the present disclosure.

Referring to FIGS. 12-14, the door panels 270, 272 are generally manually adjustable along the respective rails 40, 42, 232, 234. It is contemplated that the inner doors 48, 84 may be automatic or motorized without departing the teachings herein. Each rail 40, 42, 232, 234 may include two parallel tracks 274, 276. In this way, each of the door panels 270, 272 is configured to translate along a respective track 274, 276 of the respective rails 40, 44, 232, 234.

The first door panels 270 each include a handle 278, providing a grasping location for the user. The user applies an upward force to the handle 278, raising the first door panels 270 slide along the first tracks 274, 276 of the respective rails 40, 44, 232, 234. The first door panels 270 are configured to slide behind the second door panels 272, as illustrated in FIG. 12.

Once the first door panels 270 are behind the second door panels 272, the handles 278 engage lips 280 on the second door panels 272, respectively, which causes the force applied to handles 278 to also move the second door panels 272 with the first door panels 270. The first and second door panels 270, 272 then move together vertically and over the cargo spaces 242, 244 to the opened positions. Though both inner doors 48, 84 are illustrated in the various positions in FIGS. 12-14, it is understood that the inner doors 48, 84 are separately and independently operable.

In order to close the inner doors 48, 84, the user applies a generally downward force to the handles 278, which moves the first door panels 270 along the tracks 274, 276. The first door panels 270 are adjusted to be moved from behind the second door panels 272 to adjacent to the second door panels 272, as illustrated in FIG. 14. Rear protrusions 282 of the first door panels 270 engage the lips 280 of the second door panels 272 to cause the second door panel 272 to be moved with the first door panel 270 to the closed positions.

Figure 15:
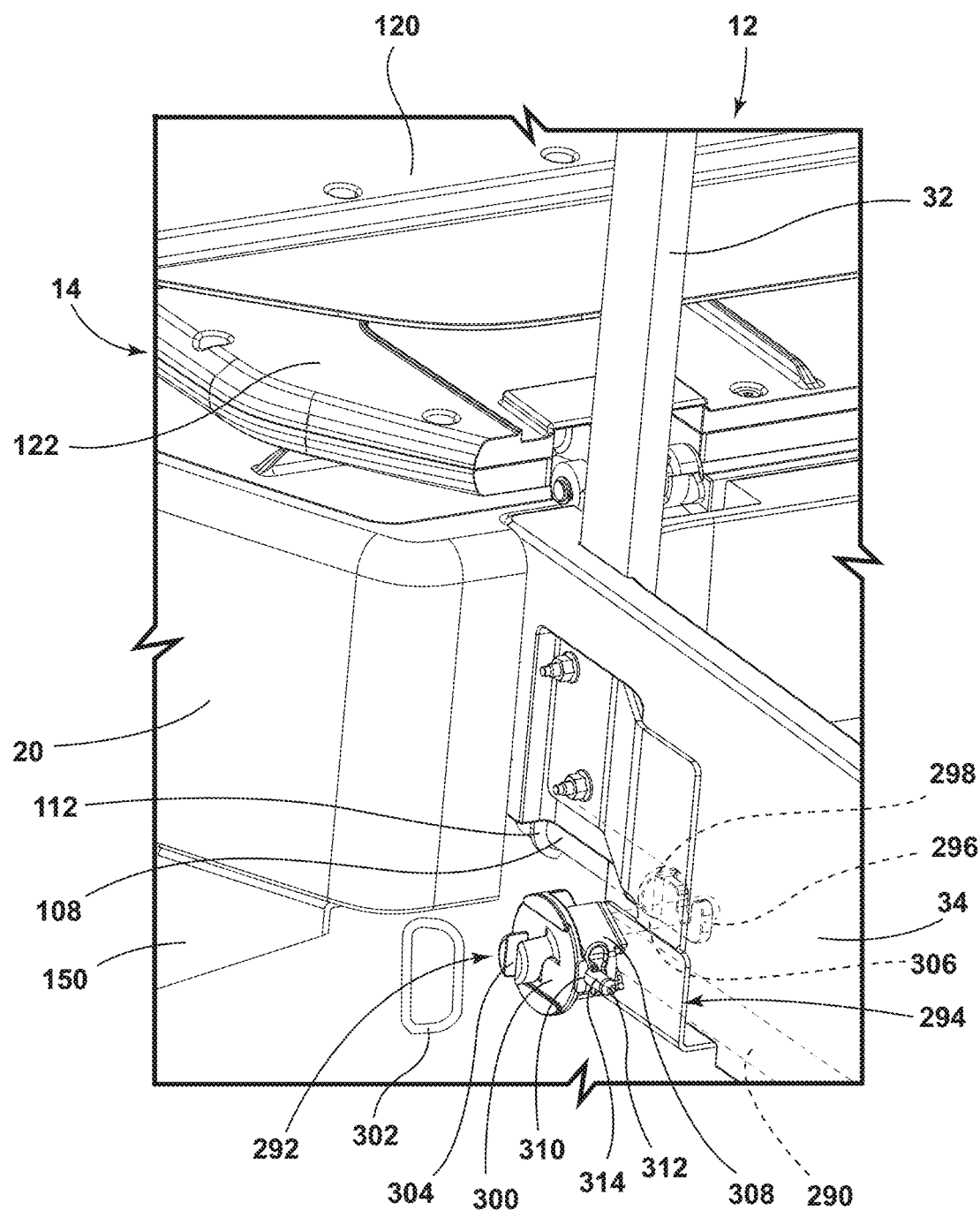
FIG. 15 is a partial side perspective exploded view of an engagement between a first storage assembly and a second storage assembly for a cargo management system, according to the present disclosure.
Figure 16:
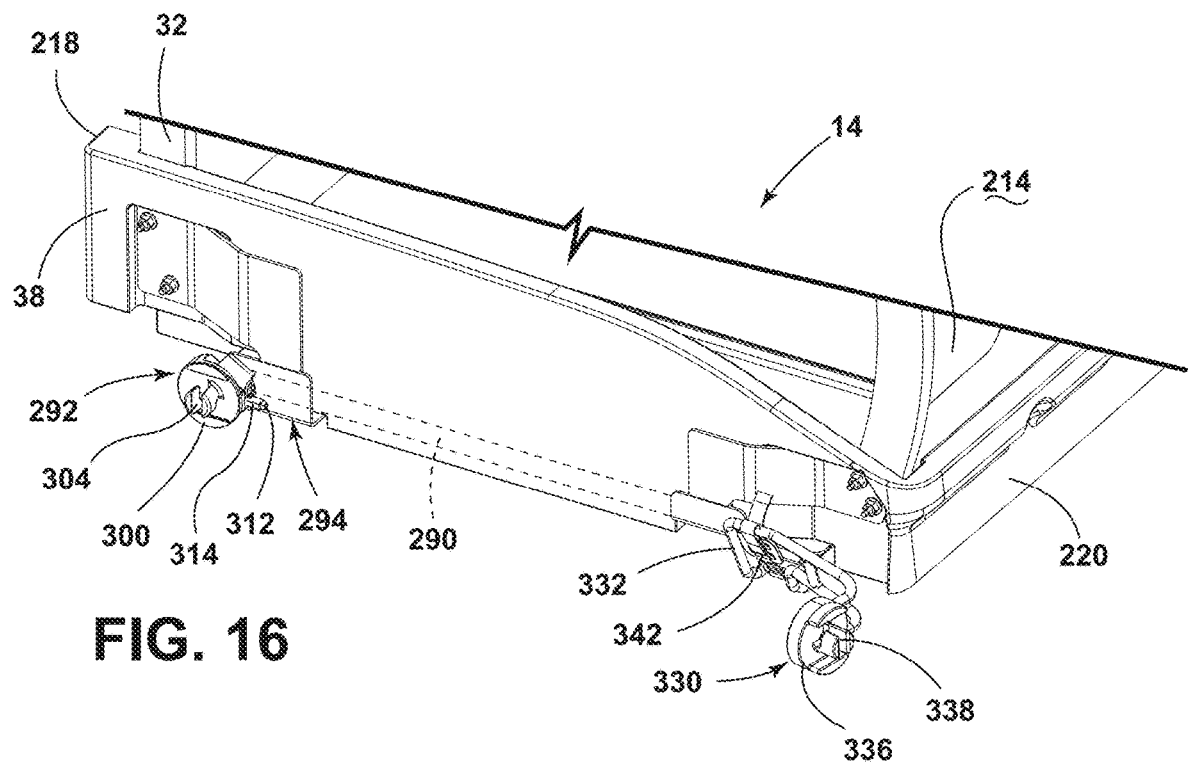
FIG. 16 is a partial side perspective view of a second storage assembly for a vehicle cargo management system, according to the present disclosure.

Referring to FIGS. 15 and 16, when installed in the vehicle 10 (FIG. 1), the second storage assembly 16 is coupled to the first storage assembly 14. The second base 34 includes a second support frame 290 that extends along opposing lateral sides thereof, generally within channels defined by the second base 34. The second support frame 290 is generally a metal frame that provides additional support and connection points for the second storage assembly 16. The first support frame 108 of the first storage assembly 14 is coupled to the second support frame 290 of the second storage assembly 16 via connector links 292 and bracket assemblies 294. A single side engagement is illustrated but is it understood that each side of the cargo management system 12 includes the same structures for installing the cargo management system 12.

The first support frame 108 includes receiving hooks 296 at the ends thereof. The connector links 292 each include a shaft 298 that is positioned within the receiving hooks 296 and retained in position via an interference fit or snap engagement. The shaft 298 is configured to rotate within the receiving hooks 296 to adjust a position of a connection end 300. The connection end 300 is configured to engage hooks 302 (e.g., front hooks) in the vehicle 10 (FIG. 1), which are coupled to the vehicle body proximate to the seating assemblies 18. The connection end 300 defines a slot 304. The connection end 300 is positioned such that the hook 302 is moved into the slot 304 and then moved further into the slot 304 via rotation of the connector link 292.

The bracket assembly 294 includes a coupling bracket 306 and a receiving bracket 308. The coupling bracket 306 is coupled to the second base 34 and configured to engage the second support frame 290. The receiving bracket 308 is coupled to the coupling bracket 306. The receiving bracket 308 is V-shaped, having angled sides and defining an aperture 310 therebetween. The angled sides of the receiving bracket 308 abut angled surfaces of the connection end 300. The connection end 300 of the connector link 292 includes a projection 312, which is configured to extend through the aperture 310 of the receiving bracket 308. A pin 314 is inserted through receiving holes in the projection 312 to secure the engagement of the second storage assembly 16 with both the first storage assembly 14 and the vehicle 10.

Figure 17:
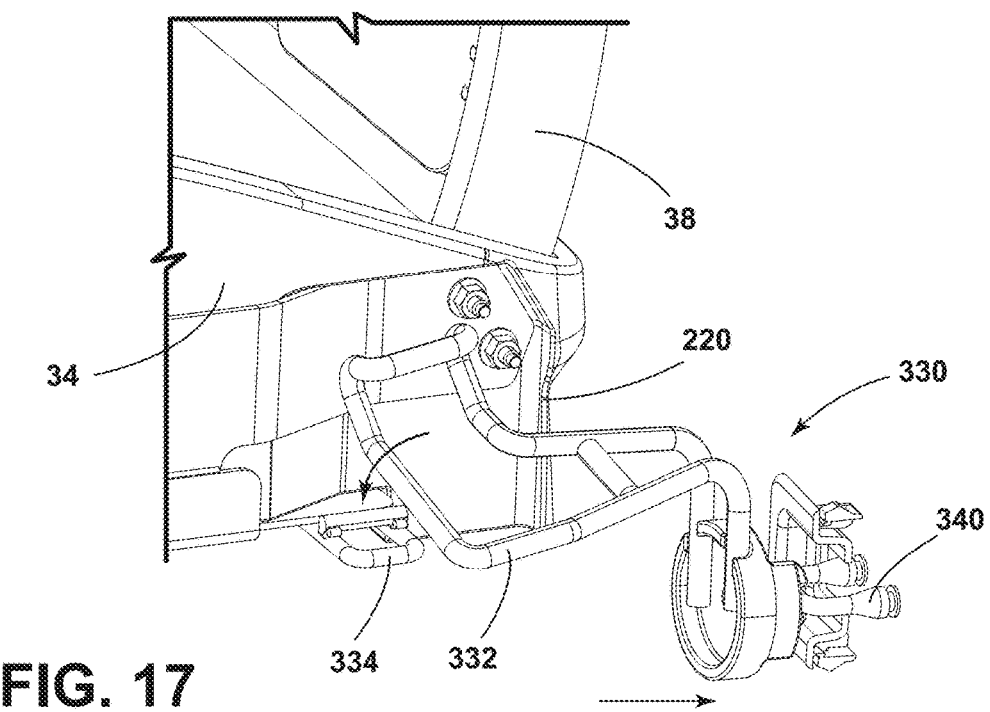
FIG. 17 is a partial side perspective view of an engagement between a second storage assembly for a cargo management system and a hook of a vehicle via a linkage, according to the present disclosure.

Referring still to FIG. 16, as well as FIG. 17, the second cargo storage assembly is also coupled to the vehicle 10 proximate to the liftgate opening 68. While only one side is illustrated, it is understood that both sides of the second storage assembly 16 are coupled to the vehicle 10 in a similar manner with similar structures. The second base 34 is coupled to the vehicle 10 body proximate the liftgate opening 68 via a connector linkage 330. The connector linkage 330 includes a link 332 configured to abut coupling extensions 334 extending laterally from the second base 34.

The connector linkage 330 also includes a connector end 336, which defines a slot 338. The connector end 336 is configured to engage a hook 340 coupled to the vehicle 10 adjacent to the liftgate opening 68 (e.g., rear hooks 340). The connector end 336 is positioned so the hook 340 is moved into the slot 338 and then further into the slot 338 as the connector linkage 330 is rotated. As the connector linkage 330 is rotated, the link 332 is moved to abut the coupling extension 334. A strap 342 is then coupled to the link 332 and the coupling extension 334 to secure the attachment to the vehicle 10.

Figure 18:
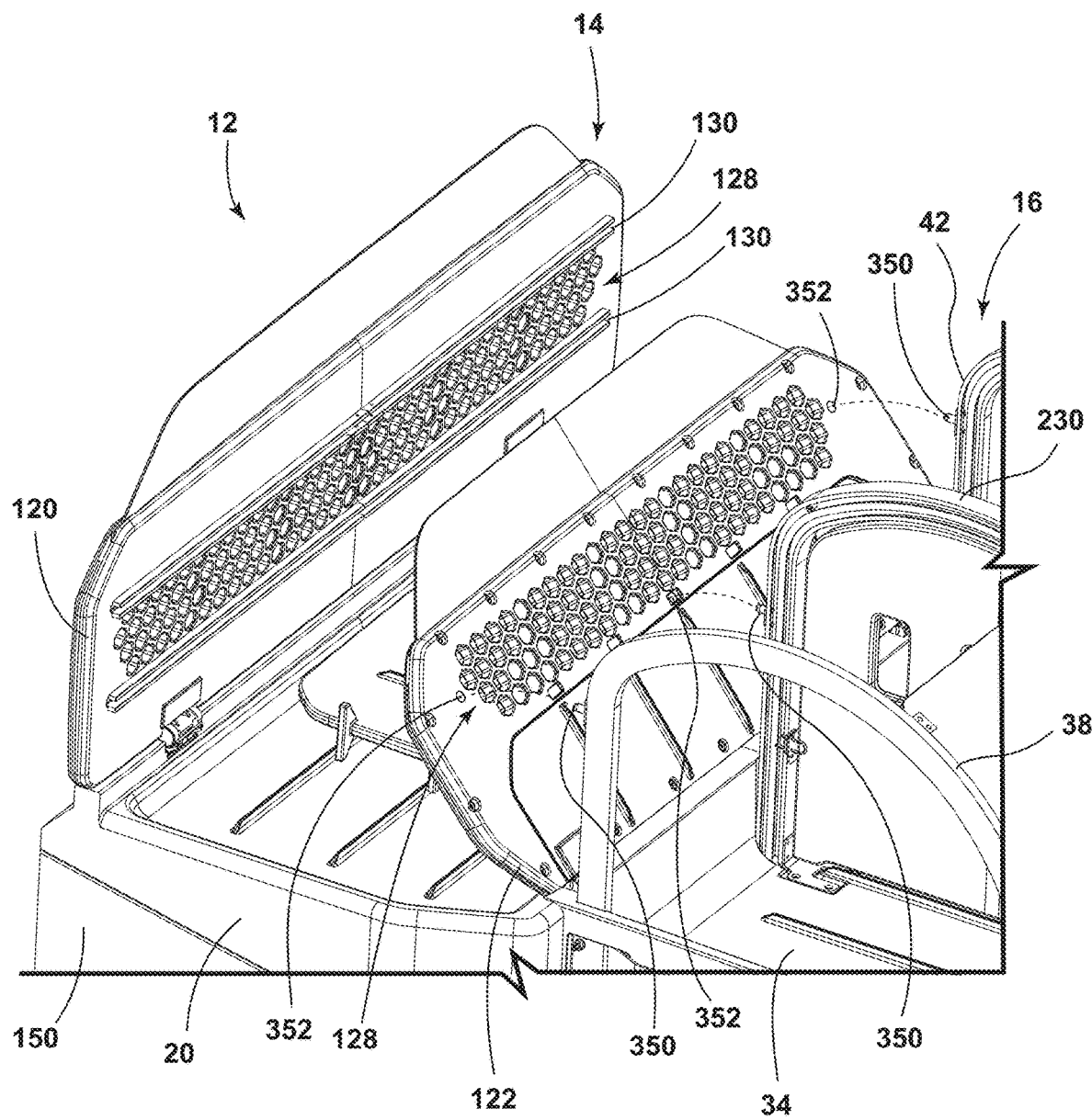
FIG. 18 is a partial side perspective view of an engagement between a sidewall of a first storage assembly and frame members of a second storage assembly of a cargo management system, according to the present disclosure.

Referring to FIG. 18, the second sidewall 122 is also configured to act as a wall for the second storage assembly 16 when both storage assemblies 14, 16 are installed within the vehicle 10. The second sidewall 122 also provides additional engagement locations between the storage assemblies 14, 16. The second sidewall 122 engages each of the frame members 38, 42, 230 to provide additional coupling locations between the first and second storage assemblies 14, 16. Generally, each frame member 38, 42, 230 includes a locating protrusion 350 extending in a vehicle-forward direction. The second sidewall 122 defines receiving apertures 352 configured to receive the respective locating protrusions 350. The receiving apertures 352 may be disposed below the plurality of apertures 128 arranged across the second sidewall 122. Alternatively, some of the plurality of apertures 128 may also be the receiving apertures 352. The locating protrusions 350 may form an interference fit with the second sidewall 122. This engagement may assist in maintaining the upright position of the second sidewall 122, as well as providing support for loads that may be applied on the second sidewall 122 from items in the cargo space 46.

Referring to FIGS. 1-18, the cargo management system 12 may be coupled to the vehicle 10 in six or eight locations. The first storage assembly 14 is coupled to the seating assemblies 18, and may also be coupled to the internal support 190. Both storage assemblies 14, 16 are coupled to the front hooks 302, and the second storage assembly 16 is coupled to the rear hooks 340 of the vehicle 10. Additionally, the first storage assembly 14 and the second storage assembly 16 are coupled to one another in more than one location, including the engagements between the first and second support frames 108, 290 and between the second sidewall 122 and the frame members 38, 42, 230.

The cargo management system 12 in the illustrated configuration provides between one and four storage compartments 62. Additional storage compartments 62 may be formed using multiple dividers 26 without departing from the teachings herein. The storage compartments 62 include the storage space 80, the first and second storage spaces 28, 30, the cargo space 46, and/or the first and second cargo spaces 242, 244. The cargo management system 12 provides flexible storage space for transporting goods.

Figure 19:
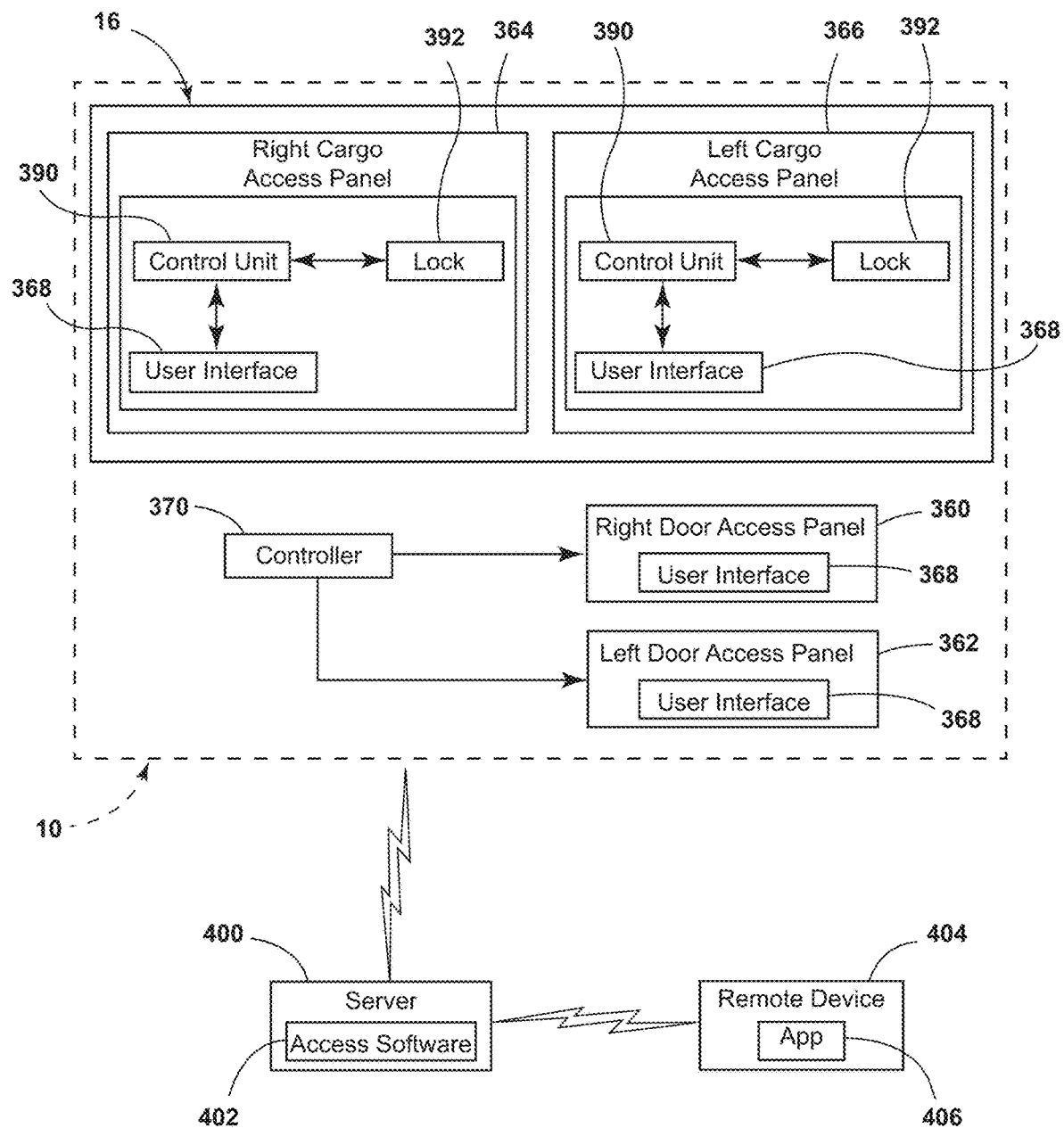
FIG. 19 is a block diagram of a cargo management system in communication with a vehicle, a server, and a remote device for coordinating delivery of goods, according to the present disclosure.

Referring still to FIGS. 1-18, as well as FIG. 19, the vehicle 10 may include access panels 360, 362, 364, 366 for providing selective and secure or authorized access to the various storage compartments 62 provided by the cargo management system 12. The vehicle 10 includes side access panels 360, 362 associated with the rear side doors 64, 66, respectively. The second storage assembly 16 may also include rear access panels 364, 366 associated with the inner doors 48, 84, respectively. The side access panels 360, 362 are configured to lock and unlock the side doors 64, 66 of the vehicle 10, while the rear access panels 364, 366 are configured to lock and unlock the inner doors 48, 84 of the second cargo assembly. The access panels 360, 362, 364, 366 may be configured as distal or door access panels that receive an access code (e.g., passcode, pin, etc.) via a user interface 368. When the user provides the correct access code, the respective door 48, 64, 66, 84 is configured to unlock to be opened.

The side access panels 360, 362 may be operably coupled to a controller 370 of the vehicle 10. The controller 370 includes a processor, a memory, and other control circuitry, such as communication circuitry. Instructions or routines are stored within the memory and executable by the processor. The controller 370 is in communication with the side access panels 360, 362 to receive the inputted access code via the user interface 368 and may send a signal to the respective lock associated to unlock the door 64, 66.

Each of the rear access panels 364, 366 of the second cargo assembly may include a control unit 390 having a processor, a memory, and other control circuitry, such as communication circuitry. Instructions or routines are stored in the memory and executable by the processor. Each control unit 390 is configured to receive the access code via the user interface 368 and may lock or unlock the inner doors 48, 84 accordingly. The locks 392 on the inner doors 48, 84 ae generally electronic locks 392, which utilize the user pin or access code as the single input to unlock. It is contemplated that the side access panels 360, 362 may be separate from the controller 370, having individual control units without departing from the teachings herein. Further, it is contemplated that the rear access panels 364, 366 may be in communication with the controller 370 without departing from the teachings herein.

The cargo management system 12 may be configured to communicate with a server 400 having access software 402, which is in communication with the controller 370 of the vehicle 10 and/or each of the control units 390 on the second storage assembly 16. Further, the server 400 is in communication with a remote device 404, having an application or app 406. Each of the communication circuitries for the controller 370 and the control units 390 may be configured for bidirectional or multidirectional communication via wired or wireless protocols.

Referring still to FIGS. 1-19, when the vehicle 10 is used for transporting goods, the goods are placed in a select storage compartment 62 of the cargo management system 12. The location of the goods in the vehicle 10 (e.g., which storage compartment 62) may be input into the server 400. The server 400 then communicates with the remote device 404 to indicate which of the storage compartments 62 in the vehicle 10 the goods are located. The remote device 404 may also receive information about the type of vehicle 10, as well as the location of the vehicle 10 to track the delivery of the goods.

The server 400 also communicates the access code to the remote device 404 for accessing the goods. The access code is also communicated to the controller 370 of the vehicle 10 and/or the control unit 390 of the respective rear access panel 364, 366, such that the access code will unlock the select storage compartment 62 and not any of the other storage compartments 62. Alternatively, the access code for each access panel 360, 362, 364, 366 may be a preprogrammed code that remains the same.

To install the storage assemblies 14, 16, the seating assemblies 18 are folded to the stowed position and the connectors 162 are attached to the support bars 160. The first storage assembly 14 is inserted into the interior compartment 60 via the liftgate opening 68 and rotated to be positioned on the seatbacks 22. The bracket assemblies 166 on the first base 20 are positioned so the locating projections 178 on the connectors 162 extend through the apertures 176 of the receiving brackets 174, and the pins 180 are inserted through the locating projections 178 to securely couple the first storage assembly 14 to the seatbacks 22. In certain aspects, the strap assembly 194 is coupled to the coupling supports 192 on the first base 20 and the internal support 190 of the vehicle 10. The first and second sidewalls 120, 122 are rotated to the upright position. The divider 26 is positioned with the slide projections 140 in the grooves 130 of the sidewalls 120, 122 and secured in position.

The second storage assembly 16 is inserted into the cargo area 32 through the liftgate opening 68. The connector links 292 are positioned in the receiving hooks 296 and rotated to secure the first support frame 108 to the second support frame 290, as well as the support frames 108, 290 to the front hooks 302. The second storage assembly 16 is coupled to the rear hooks 340 via the connector linkages 330 and the straps 342. Further, the locating protrusions 350 extending from the frame members 38, 42, 230 are inserted into the receiving apertures 352 in the second sidewall 122. The dividing wall 240 may also be coupled to the central frame member 230.

In various examples, the vehicle 10 includes a light source to illuminate the storage compartments 62. The light sources may be activated based on the storage compartment 62 being accessed. Further, the cargo management system 12 may include various cameras or image sensors that may be disposed around the interior compartment 60 of the vehicle 10. For example, when the vehicle 10 is used for deliveries of goods or other items, various image sensors may be utilized for identifying and monitoring the items in the storage compartments 62.

Use of the present device may provide a variety of advantages. For example, the storage assemblies 14, 16 may be quickly and conveniently installed and removed from the vehicle 10. Further, the cargo management system 12 may utilize the first storage assembly 14, the second storage assembly 16, or both, depending on whether goods, people, or both are in the vehicle 10. The cargo management system 12 generally provides between one and four storage spaces. Additionally, the size of at least two of the storage compartments 62 may be adjusted based on the position of the divider 26. Further, the dividing wall 240 and the divider 26 may each be removed to provide larger storage compartments 62. Moreover, the cargo management system 12 has multiple connection points with one another and the vehicle 10 to provide a more secure installation of the cargo management system 12. Further, the cargo management system 12 allows a convenient transition between carrying people and transporting goods. Also, the inner doors 48, 84 may provide selective access to the cargo spaces 242, 244. Further, the cargo management system 12 may control access to the various storage compartments 62 through the various access panels 360, 362, 364, 366. Additional benefits or advantages may be realized and/or achieved.

According to various examples, a vehicle includes a first storage assembly configured to be disposed on seating assemblies within a seating row. A first base is disposed on seatbacks of the seating assemblies. At least one sidewall is rotatably coupled to the first base. A divider is disposed over the first base and configured to slidably engage the at least one sidewall to define a first storage space and a second storage space. A second storage assembly is configured to be disposed in a cargo area adjacent to the seating row. The second storage assembly includes a second base disposed on a floor in the cargo area. A first frame member is coupled to the second base and defines a first rail. A second frame member is coupled to the second base and defines a second rail. A cargo storage space is defined between the first frame member and the second frame member. A door is coupled to the first frame member and the second frame member and configured to translate along the first and second rails between an opened position and a closed position. Embodiments of the present disclosure may include one or a combination of the following features:

- the at least one sidewall includes a first sidewall rotatably coupled to a vehicle-forward edge of the first base and a second sidewall rotatably coupled to a vehicle-rearward edge of the first base;
- each of the first frame member and the second frame member includes a locating protrusion configured to extend through receiving apertures defined by the second sidewall;
- the first and second storage spaces are accessible via side doors of said vehicle;
- the cargo space is accessible via the door and a liftgate of said vehicle;
- a connector defining a slot for rotatably engaging support bar on one of the seating assemblies;
- the connector includes a projection;
- the first base includes a bracket defining an aperture configured to receive the projection to couple the first base to the seating assembly;
- the at least one sidewall defines a groove;
- the divider has a slide projection slidably received within a groove;
- the divider is configured to translate along the groove of the at least one sidewall to adjust a size of the first storage space and the second storage space;
- the divider includes hooks;
- the second storage assembly includes a connector linkage configured to couple to a hook of said vehicle and a coupling extension extending from the second base; and
- the connector linkage includes a connector end defining a slot to rotatably engage the hook.

According to various examples, a cargo management system for a vehicle includes a first storage assembly configured to be disposed on a rear seating row and including a first base. First and second sidewalls are rotatably coupled to the first base. The first and second sidewalls each define a groove. A divider extends between the first and second sidewall. The divider has projections slidably received within the grooves. A second storage assembly is configured to be disposed in a cargo area. The second storage assembly includes a second base. First and second frame members are coupled to the second base, and each of the first and second frame members defines a rail. A first door is coupled to the first and second frame members and configured to translate along the rails between an opened position and a closed position. Embodiments of the present disclosure may include one or a combination of the following features:

- the second storage assembly includes a third frame member coupled to the second base and defines a third rail;
- the second frame defines a second rail;
- a second door configured to translate along the second rail of the second frame member and the third rail of the third frame member between an opened position and a closed position;
- the second cargo assembly includes a dividing wall coupled to the second frame member to define a first cargo storage space accessible via the first door and a second cargo storage space accessible via the second door;
- the second storage assembly includes an access panel operably coupled to the first door;
- the first door is configured to be unlocked to translate to the opened position in response to an access code received by the access panel;
- a connector link configured to selectively couple the first storage assembly with the second storage assembly;
- the first storage assembly includes a first support frame coupled to the first base and the second storage assembly includes a second support frame coupled to the second base;
- the connector link couples to each of the first support frame and the second support frame;
- each of the first base and the second base define an outer rim extending about a recessed region;
- each recessed region includes slide stops extending across a surface thereof; and
- the first storage assembly includes side guards extending from opposing lateral sides of the first base.

According to various examples, a cargo management system for a vehicle includes a first storage assembly including a first base. First and second sidewalls are rotatably coupled to the first base, and each of the first and second sidewalls defines a groove. A divider extends between the first and second sidewalls. The divider includes projections configured to translate along the grooves. A second storage assembly is coupled to the first storage assembly. The second storage assembly includes a second base. A first side frame member is coupled to a first side of the second base and defines a first side rail. A second side frame member is coupled to a second side of the second base and defines a second side rail. A central frame member is coupled to the second base between the first and second side frame members. The central frame member defines a first central rail and a second central rail. A first door is coupled to the first side frame member and the central frame member. A second door is coupled to the second side frame member and the central frame member. Embodiments of the present disclosure may include one or a combination of the following features:

- the first storage assembly includes a first support frame coupled to the first base;
- the second storage assembly includes a second support frame coupled to the second base;
- the first support frame is coupled to the second support frame via a connector link;
- each of the first door and the second door are configured to translate vertically between an opened position and a closed position;
- the second storage assembly includes a dividing wall coupled to the central frame member and configured to define a first cargo space accessible via the first door and a second cargo space accessible via the second door;
- the divider of the first storage assembly is configured to form a first storage space and a second storage space; and
- the divider is configured to translate along the groove to adjust a size of each of the first and second storage spaces.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
 a first storage assembly configured to be disposed on seating assemblies within a seating row:
  a first base disposed on seatbacks of the seating assemblies;
  at least one sidewall rotatably coupled to the first base; and
  a divider disposed over the first base and configured to slidably engage the at least one sidewall to define a first storage space and a second storage space; and
 a second storage assembly configured to be disposed in a cargo area adjacent to the seating row, the second storage assembly includes:
  a second base disposed on a floor in the cargo area;
  a first frame member coupled to the second base and defining a first rail;
  a second frame member coupled to the second base and defining a second rail, a cargo storage space defined between the first frame member and the second frame member;
  a door coupled to the first frame member and the second frame member and configured to translate along the first and second rails between an opened position and a closed position; and
  a connector linkage configured to couple to a hook of said vehicle and a coupling extension extending from the second base, wherein the connector linkage includes a connector end defining a slot to rotatably engage the hook.

2. The vehicle of claim 1, wherein the at least one sidewall includes a first sidewall rotatably coupled to a vehicle-forward edge of the first base and a second sidewall rotatably coupled to a vehicle-rearward edge of the first base.

3. The vehicle of claim 2, wherein each of the first frame member and the second frame member includes a locating protrusion configured to extend through receiving apertures defined by the second sidewall.

4. The vehicle of claim 1, wherein the first and second storage spaces are accessible via side doors of said vehicle, and wherein the cargo space is accessible via the door and a liftgate of said vehicle.

5. The vehicle of claim 1, further comprising:
 a connector defining a slot for rotatably engaging a support bar on one of the seating assemblies, wherein the connector includes a projection, and wherein the first base includes a bracket defining an aperture configured to receive the projection to couple the first base to the seating assembly.

6. The vehicle of claim 1, wherein the at least one sidewall defines a groove, and wherein the divider has a slide projection slidably received within a groove.

7. The vehicle of claim 6, wherein the divider is configured to translate along the groove of the at least one sidewall to adjust a size of the first storage space and the second storage space, and wherein the divider includes hooks.

8. A cargo management system for a vehicle, comprising:
 a first storage assembly configured to be disposed on a rear seating row including:
  a first base;
  a first support frame coupled to the first base;
  first and second sidewalls rotatably coupled to the first base, wherein the first and second sidewalls each define a groove; and
  a divider extending between the first and second sidewalls, wherein the divider has projections slidably received within the grooves, respectively;

a second storage assembly configured to be disposed in a cargo area, the second storage assembly including:
  a second base;
  a second support frame coupled to the second base;
  first and second frame members coupled to the second base, each of the first and second frame members defining a rail; and
  a first door coupled to the first and second frame members and configured to translate along the rails between an opened position and a closed position; and
a connector link configured to selectively couple the first storage assembly with the second storage assembly, wherein the connector link couples to each of the first support frame and the second support frame.

9. The cargo management system of claim 8, wherein the second storage assembly includes:
  a third frame member coupled to the second base and defining a third rail, wherein the second frame member defines a second rail; and
  a second door configured to translate along the second rail of the second frame member and the third rail of the third frame member between an opened position and a closed position.

10. The cargo management system of claim 9, wherein the second storage assembly includes:
  a dividing wall coupled to the second frame member to define a first cargo storage space accessible via the first door and a second cargo storage space accessible via the second door.

11. The cargo management system of claim 8, wherein the second storage assembly includes:
  an access panel operably coupled to the first door, wherein the first door is configured to be unlocked to translate to the opened position in response to an access code received by the access panel.

12. The cargo management system of claim 8, wherein each of the first base and the second base define an outer rim extending about a recessed region, and wherein each recessed region includes slide stops extending across a surface thereof.

13. The cargo management system of claim 8, wherein the first storage assembly includes side guards extending from opposing lateral sides of the first base.

14. The vehicle of claim 8, wherein each of the first base and the second base define an outer rim extending about a recessed region, and wherein each recessed region includes slide stops extending across a surface thereof.

15. The cargo management system of claim 11, further comprising:
  a server communicatively coupled with the access panel, and wherein the access code is communicated to a remote device from the server.

16. A cargo management system for a vehicle, comprising:
  a first storage assembly including:
    a first base;
    a first support frame coupled to the first base;
    first and second sidewalls rotatably coupled to the first base, each of the first and second sidewalls defining a groove; and
    a divider extending between the first and second sidewalls, wherein the divider includes projections configured to translate along the grooves; and
  a second storage assembly coupled to the first storage assembly, the second storage assembly including:
    a second base;
    a second support frame coupled to the second base, wherein the first support frame is coupled to the second support frame via a connector link;
    a first side frame member coupled to a first side of the second base and defining a first side rail;
    a second side frame member coupled to a second side of the second base and defining a second side rail;
    a central frame member coupled to the second base between the first and second side frame members, the central frame member defining a first central rail and a second central rail;
    a first door coupled to the first side frame member and the central frame member; and
    a second door coupled to the second side frame member and the central frame member.

17. The cargo management system of claim 16, wherein each of the first door and the second door are configured to translate vertically between an opened position and a closed position.

18. The cargo management system of claim 16, wherein the second storage assembly includes a dividing wall coupled to the central frame member and configured to define a first cargo space accessible via the first door and a second cargo space accessible via the second door.

19. The cargo management system of claim 16, wherein the divider of the first storage assembly is configured to form a first storage space and a second storage space, and wherein the divider is configured to translate along the groove to adjust a size of each of the first and second storage spaces.

20. The cargo management system of claim 19, further comprising:
  a server, wherein the server is configured to communicate a location of goods within the first storage space and the second storage space to a remote device.

* * * * *